(12) United States Patent
Kotani et al.

(10) Patent No.: US 8,098,015 B2
(45) Date of Patent: Jan. 17, 2012

(54) LAMP OPERATION DEVICE AND IMAGE DISPLAY DEVICE

(75) Inventors: Kazunori Kotani, Nara (JP); Hirofumi Kazumori, Kizugawa (JP); Shigeyuki Hashizume, Shijonawate (JP)

(73) Assignee: SANYO Electric Co., Ltd., Osaka (JP)

( * ) Notice: Subject to any disclaimer, the term of this patent is extended or adjusted under 35 U.S.C. 154(b) by 329 days.

(21) Appl. No.: 12/612,667

(22) Filed: Nov. 4, 2009

(65) Prior Publication Data

US 2010/0117539 A1 May 13, 2010

(30) Foreign Application Priority Data

Nov. 5, 2008 (JP) .................................. 2008-284674

(51) Int. Cl.
*H05B 39/10* (2006.01)
(52) U.S. Cl. ............. 315/88; 315/121; 315/360; 353/85
(58) Field of Classification Search ................ 315/88, 315/89, 119, 121, 360; 353/85
See application file for complete search history.

(56) References Cited

U.S. PATENT DOCUMENTS

| | | | | | |
|---|---|---|---|---|---|
| 2,859,387 | A | * | 11/1958 | Ulffers ........................... | 315/201 |
| 3,969,736 | A | * | 7/1976 | Lehmann ....................... | 396/205 |
| 4,034,259 | A | * | 7/1977 | Schoch ........................... | 315/93 |
| 4,961,028 | A | * | 10/1990 | Tanaka ............................ | 315/91 |
| 5,486,809 | A | * | 1/1996 | Wadlington, Jr. ............. | 340/477 |
| 7,327,097 | B2 | * | 2/2008 | Chang et al. ................... | 315/291 |
| 7,901,087 | B2 | * | 3/2011 | Shirasu et al. .................. | 353/85 |

FOREIGN PATENT DOCUMENTS

| | | |
|---|---|---|
| JP | 2001125199 A | 5/2001 |
| JP | 2003-75911 A | 3/2003 |
| JP | 2004157201 A | 6/2004 |

OTHER PUBLICATIONS

Japanese Office action issued on Oct. 12, 2010 in the corresponding to Japanese Patent Application No. 2010-196490.

* cited by examiner

*Primary Examiner* — Thuy Vinh Tran
(74) *Attorney, Agent, or Firm* — Novak Druce + Quigg, LLP

(57) ABSTRACT

A lamp operation device includes a mode setting part that sets an operation mode for lamps, and a lamp operation part that controls switching between the lamps in accordance with the set operation mode. The lamp operation part includes a process corresponding to a manual switching mode in which a lamp selected by a user is set as an illumination lamp, and a process corresponding to an automatic switching mode in which the plurality of lamps is automatically set in sequence as an illumination lamp. In the automatic switching mode, after one lamp has been set as the illumination lamp, cumulative illuminating time (amount of change) of the lamp is measured. Then, the illumination lamp is switched to the other lamp, depending on whether a measurement result has exceeded predetermined threshold time.

20 Claims, 24 Drawing Sheets

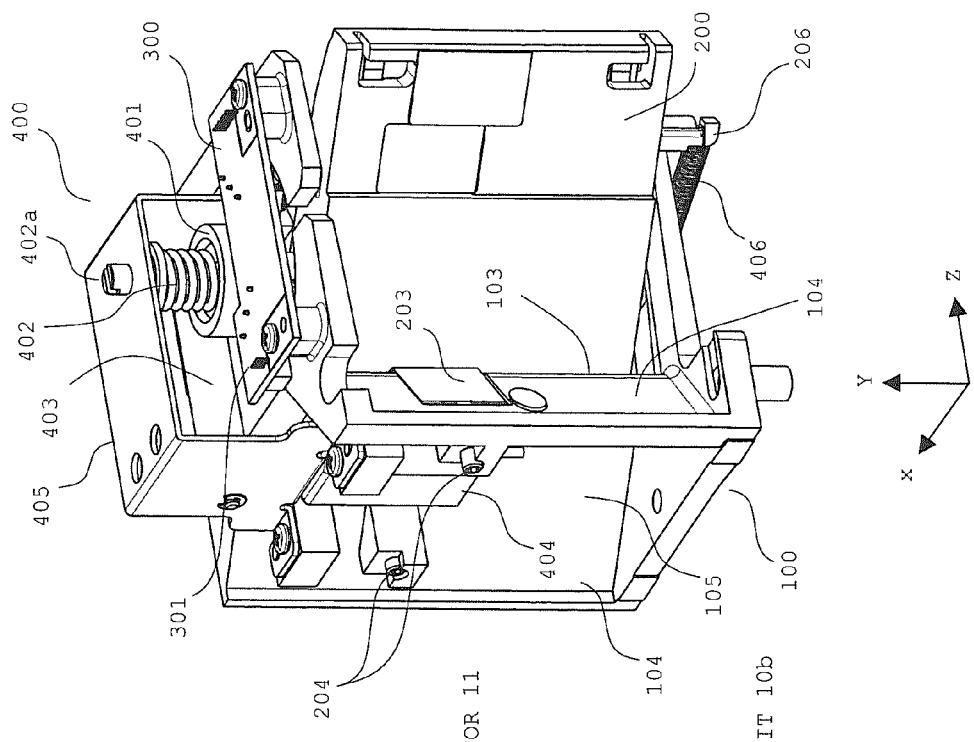
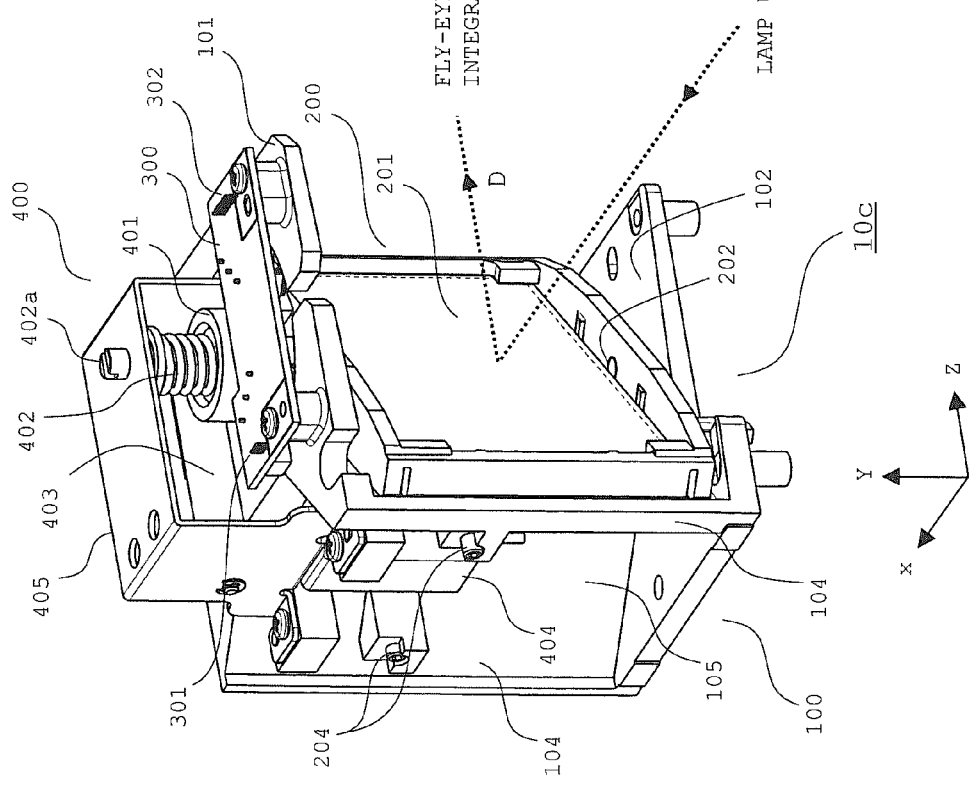

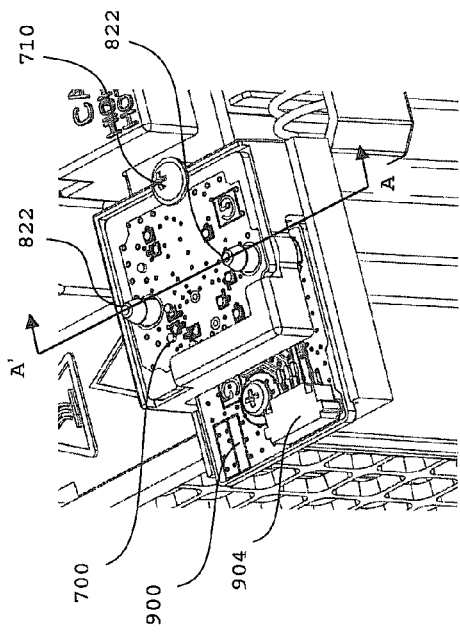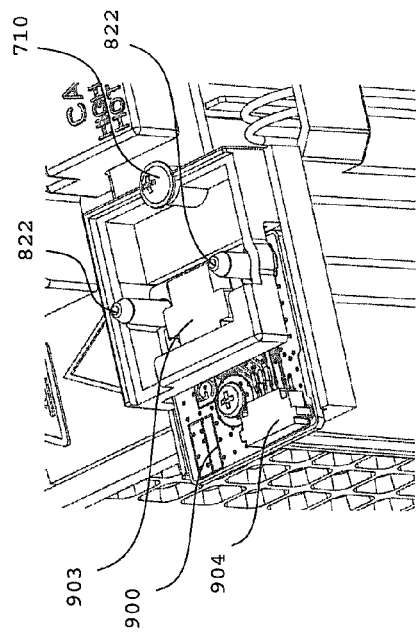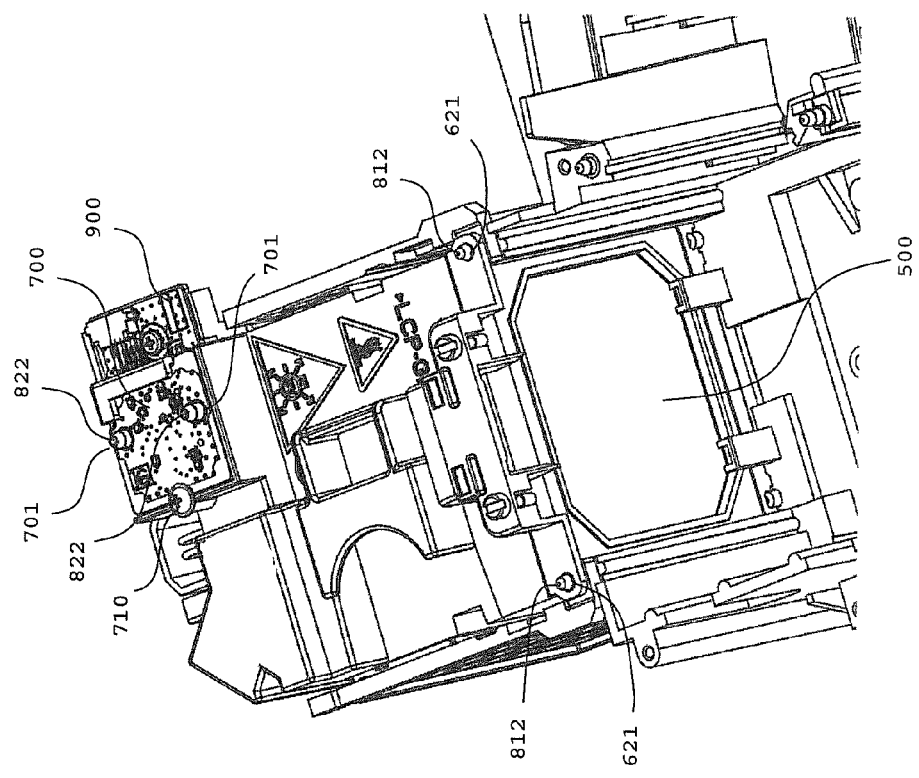

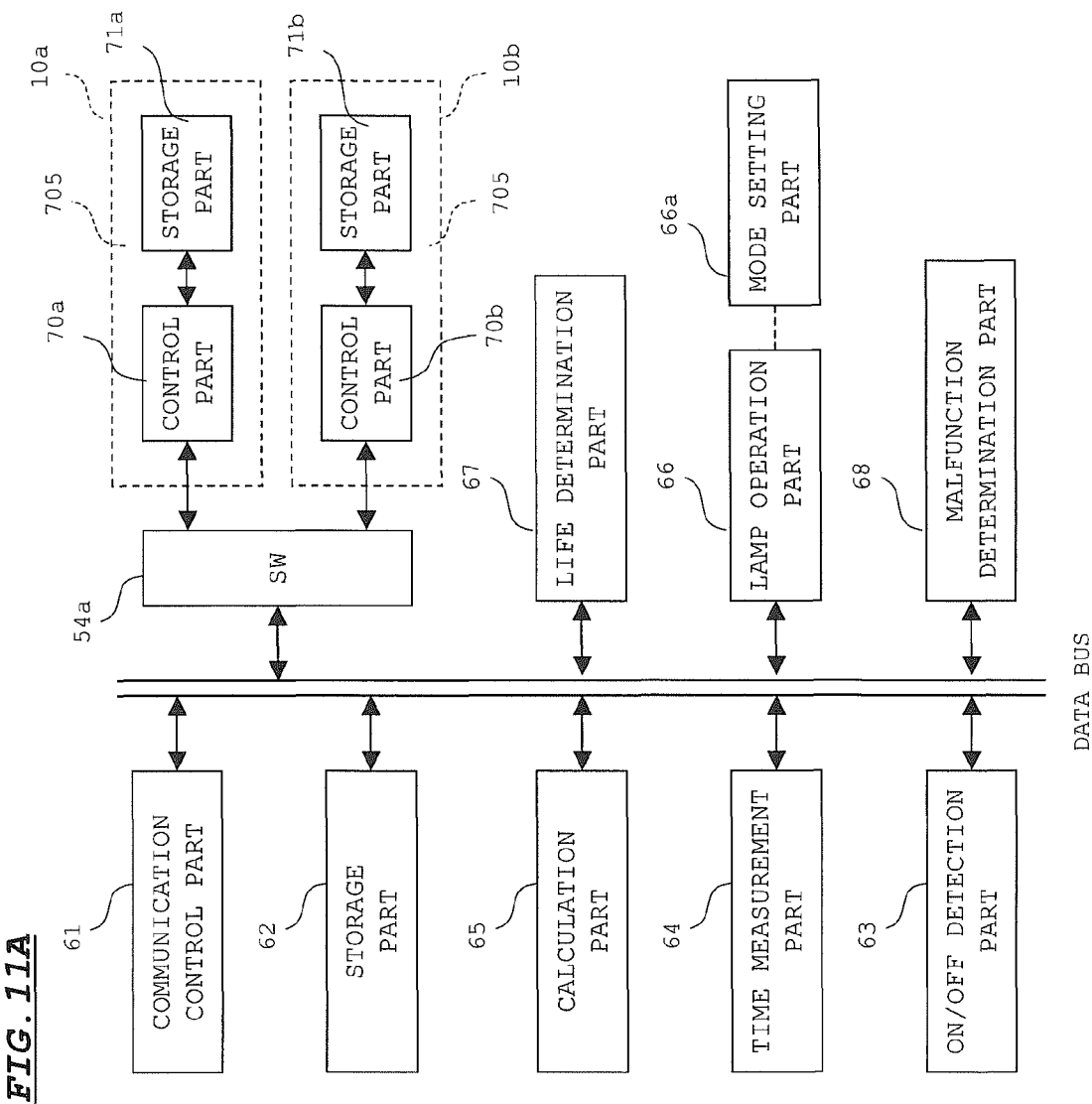

INITIALIZATION OF LAMP MANAGEMENT INFORMATION

UPDATING OF CUMULATIVE OPERATING TIME

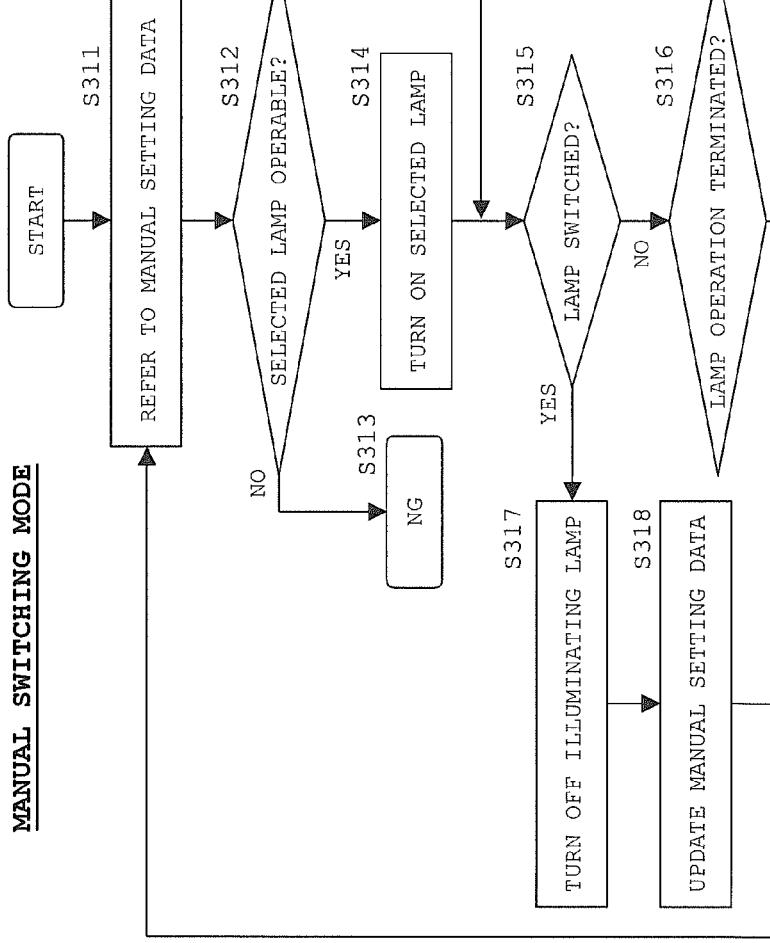

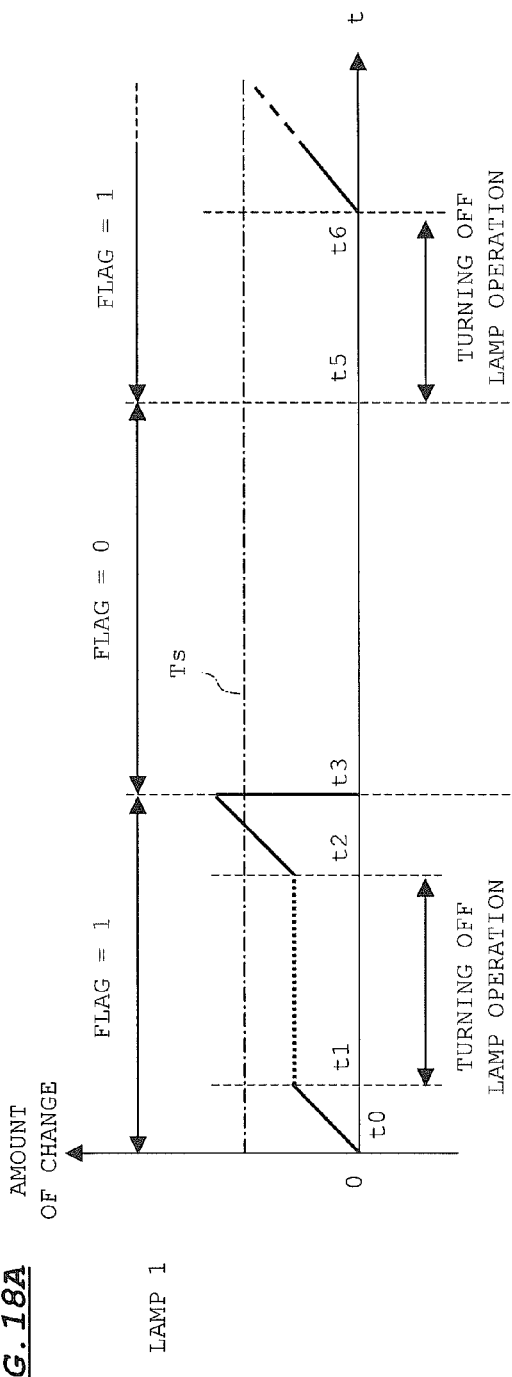
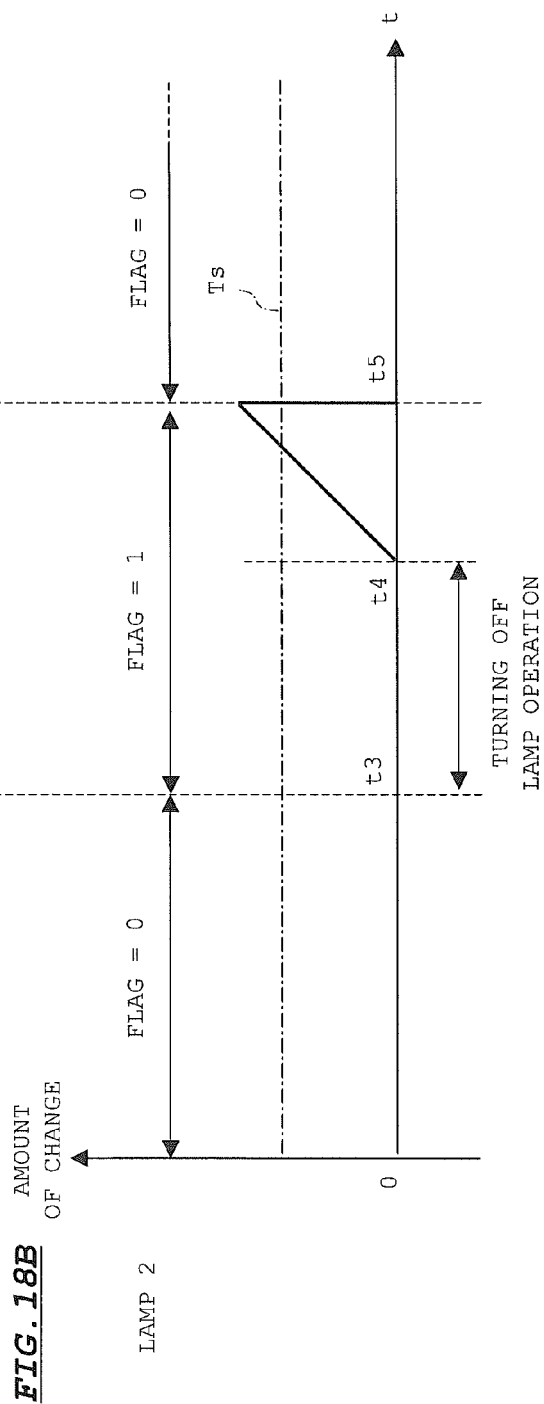

LAMP OPERATION DEVICE AND IMAGE DISPLAY DEVICE

This application claims priority under 35 U.S.C. Section 119 of Japanese Patent Application No. 2008-284674 filed Nov. 5, 2008, entitled "LAMP OPERATION DEVICE AND IMAGE DISPLAY DEVICE". The disclosure of the above application is incorporated herein by reference.

BACKGROUND OF THE INVENTION

1. Field of the Invention

The present invention relates to a lamp operation device that switches between a plurality of lamps to generate illumination light and an image display device equipped with the lamp operation device.

2. Disclosure of the Related Art

Currently, there are commercialized and widespread projection display devices that project a magnified image onto a screen (hereinafter referred to as "projectors"). In such projectors, a lamp is generally used as a light source and light from the lamp is modulated by an imager and is projected onto a screen.

In this arrangement, when the lamp has run out in the middle of projecting operation, image display is interrupted. This problem can be solved by providing the projector with a plurality of lamps. If a lamp in operation has burnt out, the lamp to be used for projection is switched to another lamp. This allows prompt resumption of image projection.

If a plurality of lamps is attached to the projector as stated above, there is an issue of how to operate each of the lamps depending on usage scenes.

For example, when making a presentation with the projector, an old lamp may be used for practice and a new high-intensity lamp is used for the real presentation.

In addition, since lamps deteriorate with repeated use, a plurality of lamps needs to be evenly operated so that each of the lamps can display a projected image with the same level of quality. Conversely, if the lamps are evenly used, the lamps may reach the end of their life at almost the same time, thereby causing trouble to image projection.

Lamps have finite life. If a lamp having reached the end of its life is continuously used, the lamp suffers damage or the like. In addition, continuous use of a lamp that is deteriorated and difficult to be turned on would decrease luminous efficiency of the lamp and might cause damage to the lamp. The damage to the lamp would cause users a workload of removing broken pieces of the lamp and the like, thereby extremely hampering convenience. Therefore, it is necessary to use the lamps properly in consideration of the lamp life and the deterioration progress.

SUMMARY OF THE INVENTION

An object of the present invention is to allow proper operation of lamps depending on usage scenes, thereby improving convenience for the user.

A first aspect of the present invention relates to a lamp operation device that switches between a plurality of lamps to generate illumination light. The lamp operation device in the first aspect includes a setting part that sets an operation mode for the lamps; and an operation part that controls switching between the lamps in accordance with the set operation mode. Here, the operation part includes a first process corresponding to a manual switching mode in which a lamp selected by a user is set as an illumination lamp; and a second process corresponding to an automatic switching mode in which the plurality of lamps is automatically set in sequence as an illumination lamp. In the second process, after a first lamp has been set as the illumination lamp, cumulative illuminating time of the first lamp is measured, and the illumination lamp is switched to a second lamp other than the first lamp, depending on whether a measurement result has exceeded predetermined threshold time.

According to the lamp operation device in the first aspect, it is possible to select as appropriate between the manual switching mode and the automatic switching mode, which allows the user to operate the lamps smoothly depending on usage scenes.

In the lamp operation device in the first aspect, the operation part may further include a third process corresponding to a life priority mode in which the illumination lamp is selected with priority given to the life of each of the lamps. Here, the third process includes steps of holding a reference lifetime indicative of the life of the lamp; and avoiding illumination of the first lamp if cumulative operating time of the first lamp as the illumination lamp from start of operation has exceeded the reference lifetime of the first lamp.

This circumvents illumination of a lamp having reached the end of the life, and thus prevents the lamp having reached the end of the life from being turned on and damaged.

A second aspect of the present invention relates to an image display device. The image display device in the second aspect is equipped with the lamp operation device in the first aspect. Accordingly, the image display device in the second aspect can produce the same advantages as described in relation to the lamp operation device in the first aspect.

In the foregoing aspects, the "illumination lamp" refers to a lamp as a target of illumination. In addition, the "cumulative operating time" refers to a total amount of operating time of a lamp after manufacture, which includes the total amount of illuminating time from the first use after manufacture until the present time.

In an embodiment described later, cumulative operating time held as cumulative time data shown in FIG. 11B corresponds to the "cumulative operating time" in the foregoing aspects. Further, the "cumulative illuminating time" in the foregoing aspects refers to a total amount of illuminating time of the first lamp from the instant when the first lamp is set as the illumination lamp to the instant the first lamp becomes no longer the illumination lamp. In the embodiment described below, an "amount of change" shown in FIG. 17B corresponds to the "cumulative illuminating time" in the foregoing aspects.

BRIEF DESCRIPTION OF THE DRAWINGS

FIGS. 3A and 3B are perspective views of a configuration of a mirror unit in the embodiment;

FIGS. 8A, 8B, and 8C are perspective views of the attached lamp unit in the embodiment.

FIG. 11A is a diagram showing a system configuration for lamp operation in an embodiment; FIGS. 11B and 11C are diagrams indicative of data for use in the configuration of FIG. 11A;

FIG. 16A is a flowchart of a process in a manual switching mode in the embodiment; FIG. 16B is a diagram showing a configuration of manual setting data;

FIGS. 18A and 18B are diagrams describing an operation of the automatic switching mode in the embodiment;

However, the drawings are only for the purpose of illustration and do not limit the scope of the present invention.

DESCRIPTION OF PREFERRED EMBODIMENTS

Hereafter, a configuration of a projector in an embodiment of the present invention will be described with reference to the drawings. The projector in this embodiment has two lamp units as light sources of the illuminating device.

Figure 1:
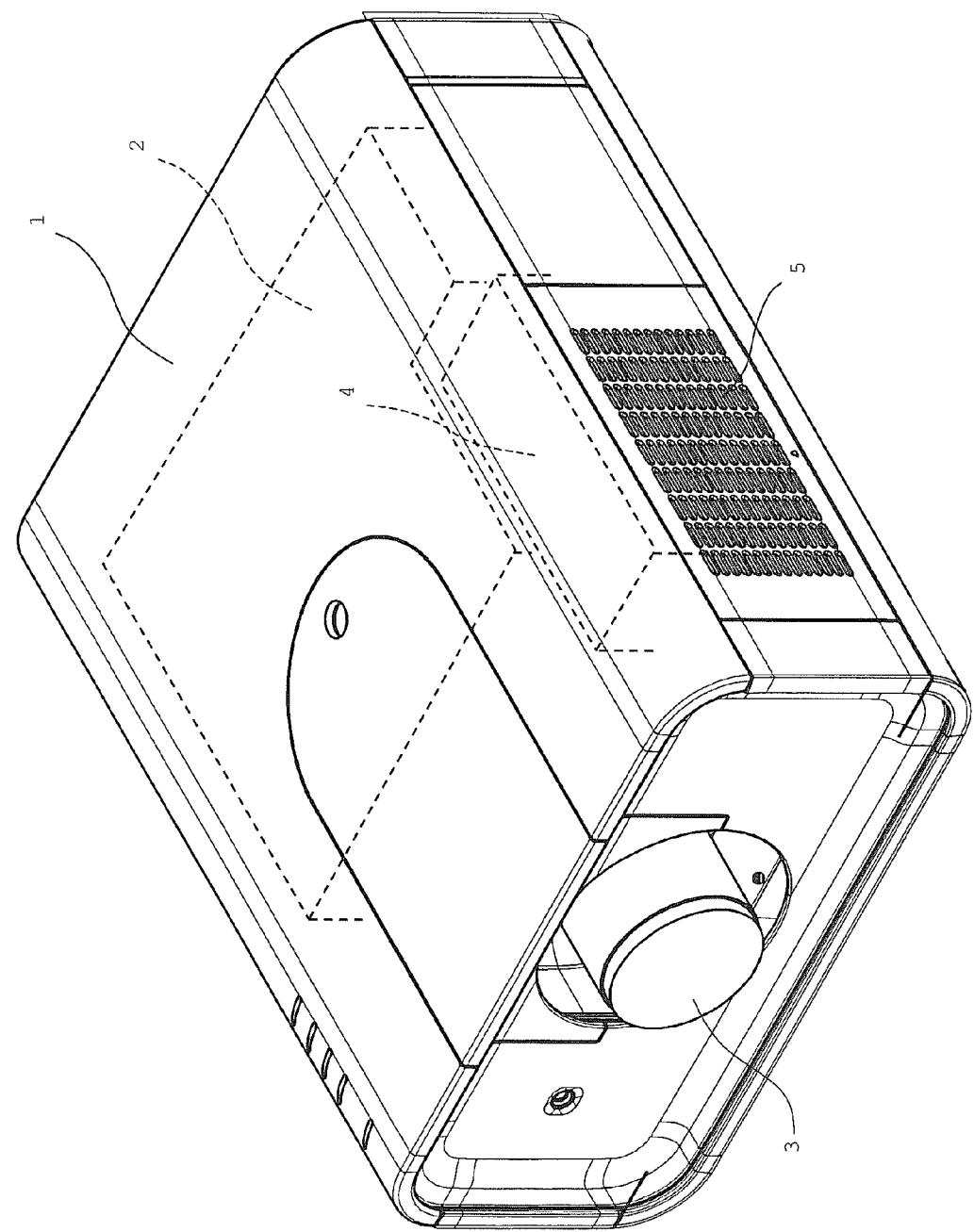
FIG. 1 is a perspective overview of a projector in an embodiment of the present invention.

FIG. 1 is a perspective overview of the configuration of the projector. The projector includes a cabinet 1. The cabinet 1 is shaped like an approximately rectangular parallelepiped that is vertically thin and horizontally long, and has an intake port 5 on a side surface to take external air into the cabinet 1. The cabinet 1 also has on a rear side an openable and closable lamp cover (not shown). The user can open the lamp cover as necessary to replace the lamp units.

The cabinet 1 includes an optical engine 2, a projection lens 3, and a cooler 4 therein. The optical engine 2 generates light modulated by an image signal (image light). The optical engine 2 has the projection lens 3 attached. A front part of the projection lens 3 is exposed from a front surface of the cabinet 1. The image light generated by the optical engine 2 is projected by the projection lens 3 onto a surface of a screen in front of the projector. The cooler 4 takes in external air from the intake port 5, and supplies the external air as cooling winds to the optical engine 2.

The projector is equipped with a remote controller (remote) for user input. The user can use the remote to issue an instruction for projection and make various settings for a lamp operation mode and the like.

Figure 2:
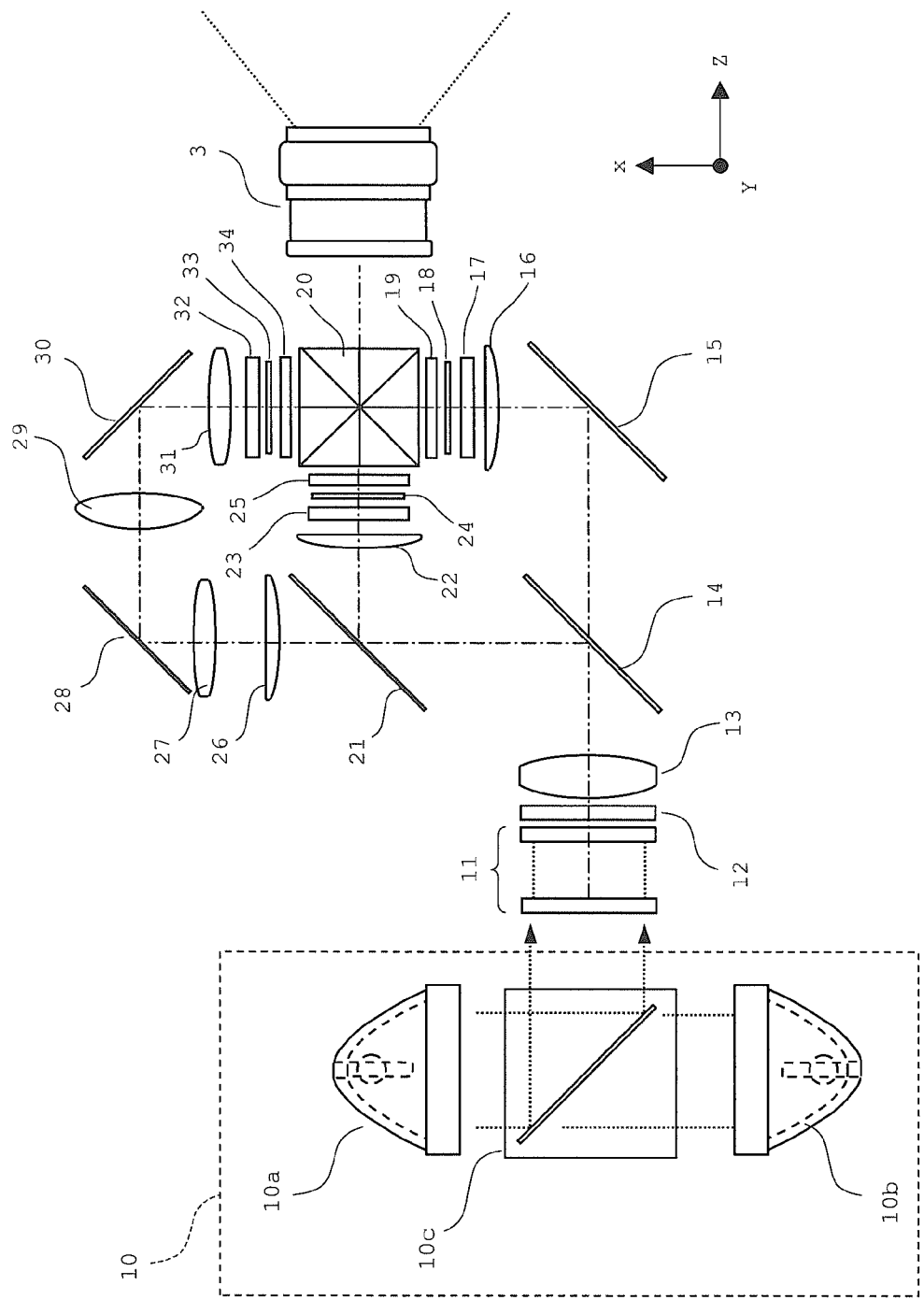
FIG. 2 is a plane view showing a configuration of an optical engine in the embodiment.

FIG. 2 is a diagram showing a configuration of the optical engine. In FIG. 2, reference numeral 10 denotes an illuminating device having two lamp units 10a and 10b and a mirror unit 10c. The lamp units 10a and 10b include lamps formed by extra high-pressure mercury lamps, metal halide lamps, xenon lamps, or the like. Light from the lamp units 10a and 10b is launched as approximately parallel light by the action of a reflector. A configuration of the lamp units 10a and 10b will be described later in detail.

The mirror unit 10c has a mirror rotatable in parallel to an X-Z plane shown in FIG. 2. The mirror is rotated to guide light from the lamp unit 10a to a fly-eye integrator 11 when the lamp unit 10a is activated, and to guide light from the lamp unit 10b to the fly-eye integrator 11 when the lamp unit 10b is activated. A configuration of the mirror unit 10c will be described later with reference to FIGS. 3A, 3B, 4, 5A, and 5B.

Light from the illuminating device 10 is entered into a polarized beam splitter (PBS) array 12 and a condenser lens 13 via the fly-eye integrator 11. The fly-eye integrator 11 includes first and second fly-eye lenses formed by fly-eye lens groups. The fly-eye integrator 11 exerts an optical effect on the incident light from the illuminating device 10 so as to bring a uniform distribution of amounts of incident light on liquid crystal panels 18, 24, and 33.

The PBS array 12 includes an array of a plurality of PBS's and half-wavelength plates, and unifies polarization directions of incident light from the fly-eye integrator 11. The condenser lens 13 exerts an effect of gathering the incident light from the PBS array 12. The light having passed through the condenser lens 13 is entered into a dichroic mirror 14.

Out of the incident light from the condenser lens 13, the dichroic mirror 14 lets only blue-waveband light (hereinafter referred to as "B light") pass through and reflects red-waveband light (hereinafter referred to as "R light") and green-waveband light (hereinafter referred to as "G light"). After having passed through the dichroic mirror 14, the B light is reflected by a mirror 15 and then is entered into a condenser lens 16.

The condenser lens 16 exerts an optical effect on the B light so that the B light is entered as approximately parallel light into a liquid crystal panel 18. After having passed through the condenser lens 16, the B light is entered into the liquid crystal panel 18 via an incident-side polarizer 17. The crystal panel 18 is driven in accordance with an image signal for blue color to modulate the B light depending on the driven state. After having modulated by the liquid crystal panel 18, the B light is entered into a dichroic prism 20 via an output-side polarizer 19.

Out of the light reflected by the dichroic mirror 14, the G light is reflected by a dichroic mirror 21 and then is entered into a condenser lens 22. The condenser lens 22 exerts an optical effect on the G light so that the G light is entered as approximately parallel light into a liquid crystal panel 24. After having passed through the condenser lens 22, the G light is entered into the liquid crystal panel 24 via an incident-side polarizer 23. The liquid crystal panel 24 is driven in accordance with an image signal for green color to modulate the G light depending on the driven state. After having modulated by the liquid crystal panel 24, the G light is entered into the dichroic prism 20 via an output-side polarizer 25.

After having passed through the dichroic mirror 21, the R light is entered into a condenser lens 26. The condenser lens 26 exerts an optical effect on the R light so that the R light is entered as approximately parallel light into a liquid crystal panel 33. After having passed through the condenser lens 26, the R light travels along a light path that is formed by relay lenses 27, 29, and 31 for adjustment of light path length and two mirrors 28 and 30, and then the R light is entered into a liquid crystal panel 33 via an incident-side polarizer 32. The liquid crystal panel 33 is driven in accordance with an image signal for red color to modulate the R light depending on the driven state. After having modulated by the liquid crystal panel 33, the R light is entered into the dichroic prism 20 via an output-side polarizer 34.

The dichroic prism 20 combines the B, G, and R light respectively modulated by the liquid crystal panels 18, 24, and 33, and enters the same into the projection lens 3. The projection lens 3 includes a lens group that produces an image of projected light on a projection plane, and an actuator that displaces part of the lens group in a direction of a light axis to thereby adjust zoom and focus states of a projected image. The light combined by the dichroic prism 20 is magnified and projected onto a screen by the projection lens 3.

Next, a configuration of the mirror unit 10c will be described with reference to FIGS. 3A and 3B.

FIGS. 3A and 3B are perspective views of the configuration of the mirror unit 10c.

In FIGS. 3A and 3B, a base 100 includes an upper plate 101, a lower plate 102, a rear plate 103, and two walls 104. The upper plate 101, lower plate 102, rear plate 103, and two walls 104 are integrally formed by aluminum die casting. In addition, a hollow 105 is provided between the two walls 104 so as to continue to the upper plate 101. The lower plate 102 and the upper plate 101 are parallel to each other. A mirror holder 200 is rotatably provided between the lower plate 102 and the upper plate 101.

The two walls 104 and the rear plate 103 have on inner sides a concave contoured to be slightly larger than an adjustment plate 203. The adjustment plate 203 is fitted and screwed in the concave. The adjustment plate 203 is screwed at a central part on the rear plate 103 and is pressed at parts corresponding to the two walls 104 against the two walls 104 so as to be capable of being elastically displaced. The adjustment plate 203 is formed of a flexible, thin metal film. In addition, the two walls 104 have adjustment screws 204 screwed on outer surfaces, and ends of the adjustment screws 204 are in contact with the adjustment plate 203.

The two walls 104 are formed such that inner surfaces thereof are inclined at an angle of approximately 45 degrees with respect to the respective travel directions of light from the lamp units 10a and 10b when the mirror unit 10c is disposed in the optical engine shown in FIG. 2.

The mirror holder 200 is provided with a mirror 201. The mirror holder 200 also has projecting shafts 202 in coaxial positions on upper and lower surfaces. The shaft 202 on the lower surface of the mirror holder 200 is fitted into a shaft hole in the lower plate 102. The shaft 202 on the upper surface of the mirror holder 200 is attached to a torque limiter 402 via a shaft bearing.

The upper plate 101 has on the upper surface a substrate 300 attached via bosses. The substrate 300 has two detection switches 301 and 302 on a lower surface. The detection switches 301 and 302 are pressed and turned on by projections (not shown) on the upper surface of the mirror holder 200 when the mirror holder 200 is brought into a rotation termination position.

A drive part 400 includes a gear 401 with a torque limiter 402, a gear 403, a motor 404, a gear (not shown) attached to a drive shaft of the motor 404, a cover 405, and a coil spring 406 disposed on the lower plate 102 side. The torque limiter 402 causes the gear 401 to run idle when a specific or higher level of torque is applied. The gear 403 is rotatably attached to the cover 405. The cover 405 has a shaft hole that engages with a shaft 402a of the torque limiter 402. The cover 405 is screwed into the bosses formed on outer surfaces of the walls 104. The motor 404 is attached in the hollow 105 between the two walls 104.

A driving force from the motor 404 is transferred to the torque limiter 402 via the gear attached to the drive shaft of the motor 404 and the gears 403 and 401. The driving force is further transferred to the shaft 202 on the upper surface of the mirror holder 200, which is attached to the torque limiter 402. This arrangement allows the mirror 201 to rotate with the mirror holder 200.

The lower plate 102 has a coil spring 406 on a bottom surface. The coil spring 406 is mounted on the mirror unit 10c such that both ends thereof are locked between a hook formed on the lower surface of the mirror holder 200 and a hook formed on the bottom surface of the lower plate 102. The coil spring 406 biases the mirror holder 200 in a direction that presses the mirror holder 200 against the front wall 104 in a state shown in FIG. 3A, and biases the mirror holder 200 in a direction that presses the mirror holder 200 against the back wall 104 in a state shown in FIG. 3B.

The rotation termination position of the mirror holder 200 can be adjusted by an amount of lifting of the adjustment plate 203 using the adjustment screws 204. When the mirror unit 10c is incorporated into the optical engine shown in FIG. 2, the adjustment screws 204 are used to adjust the amount of lifting of the adjustment plate 203 so that light from both the lamp units 10a and 10b travels properly toward the fly-eye integrator 11.

As shown in FIG. 3A, light from the lamp unit 10b is reflected and guided by the mirror 201 to the fly-eye integrator 11. To switch to the other lamp unit, the motor 404 is driven to rotate the mirror unit 200 counterclockwise. This rotation is continued until a specific period of time has elapsed after the detection switch 302 is turned on.

In the meantime, the mirror unit 200 is pressed against the adjustment plate 203 to position the mirror 201 at a position shown in FIG. 3B. During the pressing, the gear 401 runs idle by the action of the torque limiter 402. Accordingly, the mirror unit 200 is situated in a position shown in FIG. 3B, and light from the lamp unit 10a is reflected and guided by the mirror 201 to the fly-eye integrator 11. If the mirror unit 10c is switched from the state of FIG. 3B to the state of FIG. 3A, the same operation as described above is performed except that the direction of driving the motor 404 is reversed.

Next, a configuration of a lamp unit and a method of mounting the lamp unit will be described below with reference to FIGS. 4 to 8A, 8B, and 8C. The following description is given taking one lamp unit as an example, but the described configuration and mounting method are applicable to both of the two lamp units 10a and 10b shown in FIG. 2.

Figure 4:
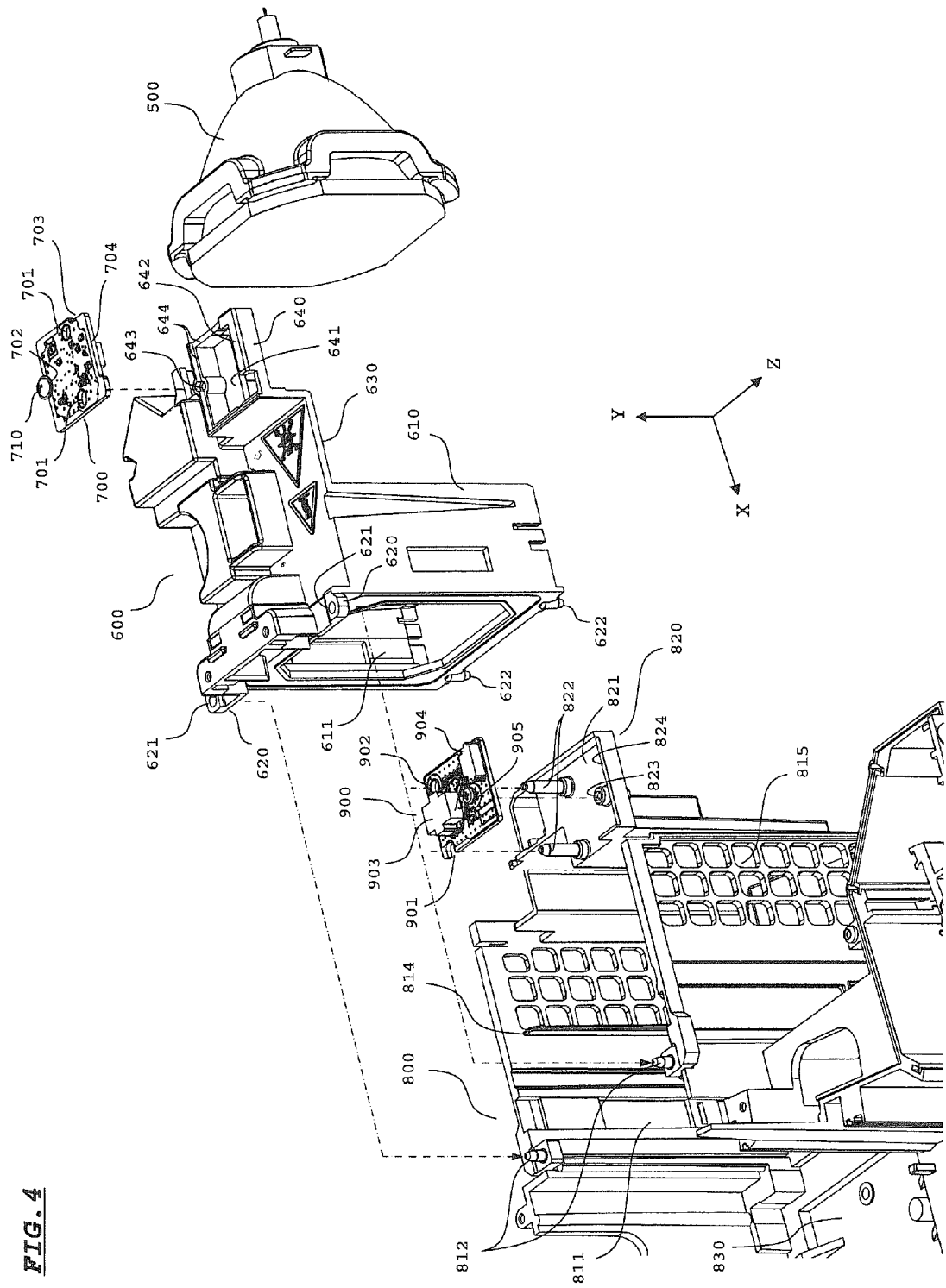
FIG. 4 is an exploded perspective view of a configuration of a lamp unit in the embodiment.

FIG. 4 is a diagram showing the configuration of a lamp unit and a mounting portion thereof. The lamp unit includes a lamp 500, a lamp holder 600 holding the lamp 500, and a circuit board 700. Meanwhile, the main unit chassis side has a holder housing 800 housing the lamp holder 600 and a circuit board 900. The mirror unit 200 is attached to a mirror unit attachment part 830 shown in FIG. 4.

The lamp holder 600 includes a box 610 to which the lamp 500 is attached. The box 610 has on a front surface an opening 611 for guiding light from the lamp 500 forward. The box 610 also has forward projecting flanges 620 with holes 621 on an upper front surface. The box 610 further has two downward projecting pins 622 on the upper front surface. In addition, the box 610 has on an upper rear surface a backward projecting L-shaped flange 630 with a board holding part 640 extending therefrom.

Figure 5B:
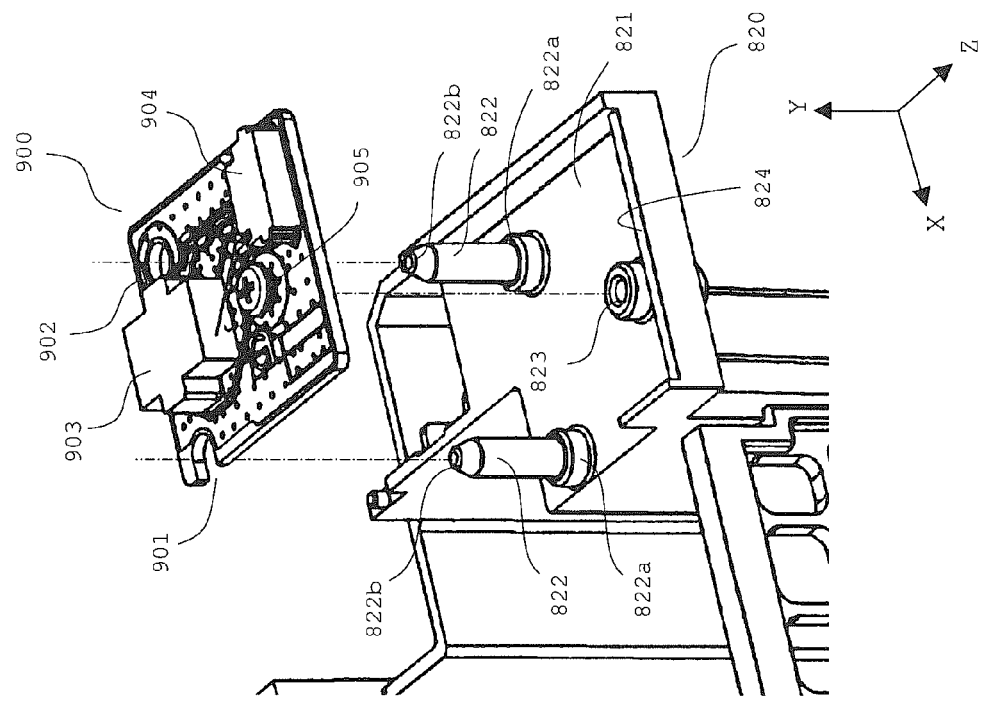
FIGS. 5A and 5B are enlarged perspective views of a part of the lamp unit in the embodiment.
Figure 5A:
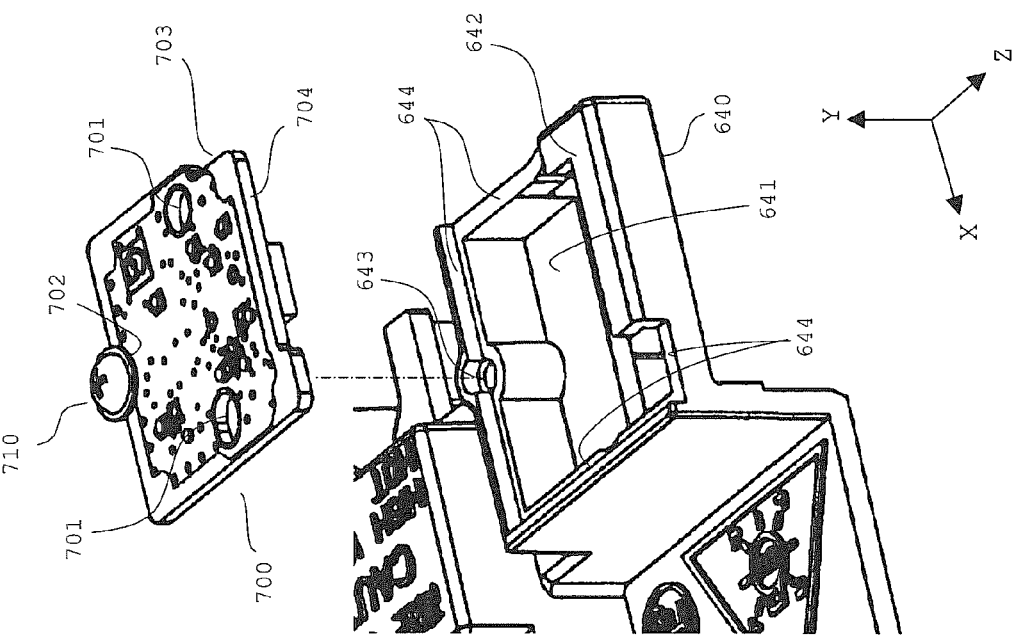

FIG. 5A is an enlarged view of the board holding part 640. The board holding part 640 has a vertically penetrating opening 641. The board holding part 640 also has on an upper surface an L-shaped locking part 642 locking the circuit board 700 in X- and Y-axis directions. The board holding part 640 also has a screw hole 643 into which a screw 710 is screwed. The board holding part 640 further has on the upper surface a placement part 644 on which an outer edge of the circuit board 700 is placed.

Figure 6A:
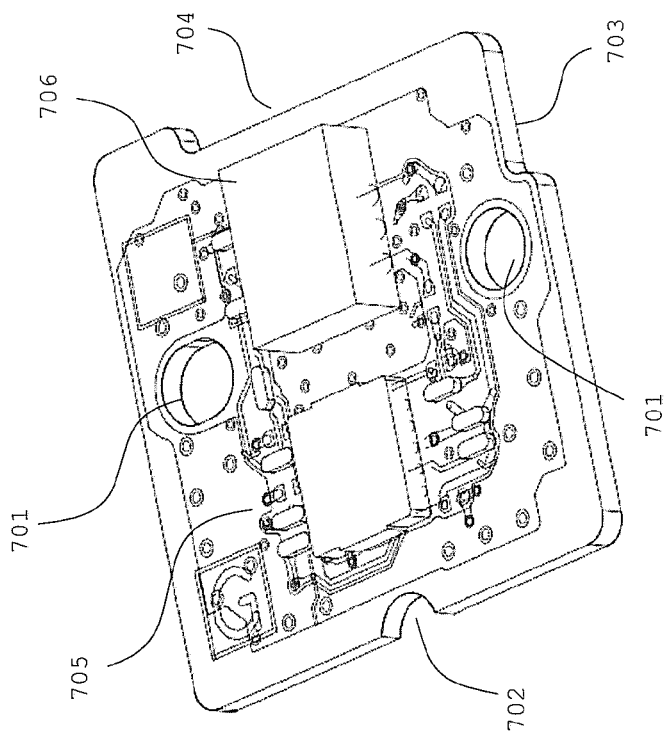
FIGS. 6A and 6B are perspective views of a configuration of a circuit board of the lamp unit in the embodiment.
Figure 6B:
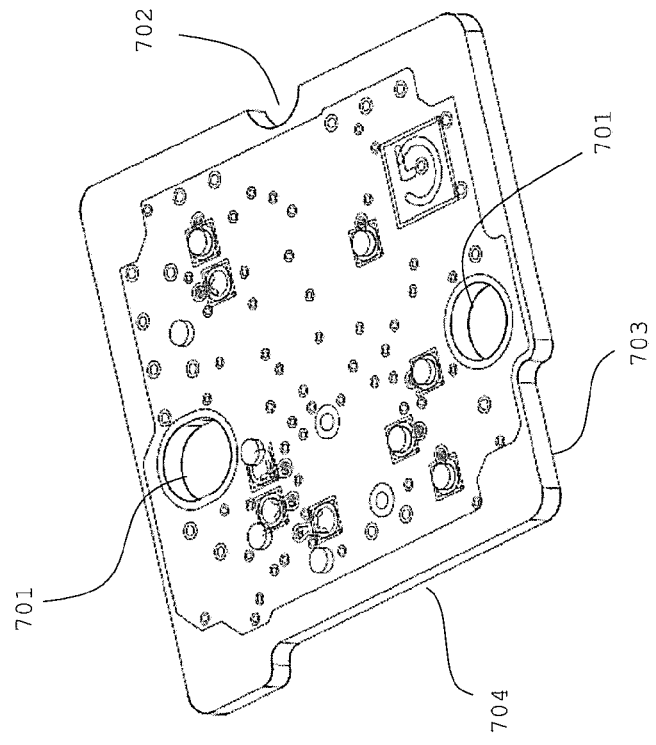

FIGS. 6A and 6B are diagrams showing a configuration of the circuit board 700. FIG. 6A is a top view and FIG. 6B is a bottom view. The circuit board 700 includes two holes 701 and a notch 702 in a position corresponding to a side screw 710. The circuit board 700 also has notches 703 and 704 in positions corresponding to the locking part 642 of the board holding part 640. The circuit board 700 has on the bottom surface a circuit part 705 including an IC and a connector 706 electrically connected to the circuit part 705.

Referring to FIG. 5A, the circuit board 700 is contoured so as to be displaceable only by a predetermined stroke in the X- and Z-axis directions when the outer edge thereof is placed on the placement part 644 while the notches 703 and 704 are fitted into the locking part 642. In addition, the placement part 644 is sufficiently widened so that the circuit board 700 does not fall into the opening 641 even if the circuit board 700 is displaced as described above.

Figure 7:
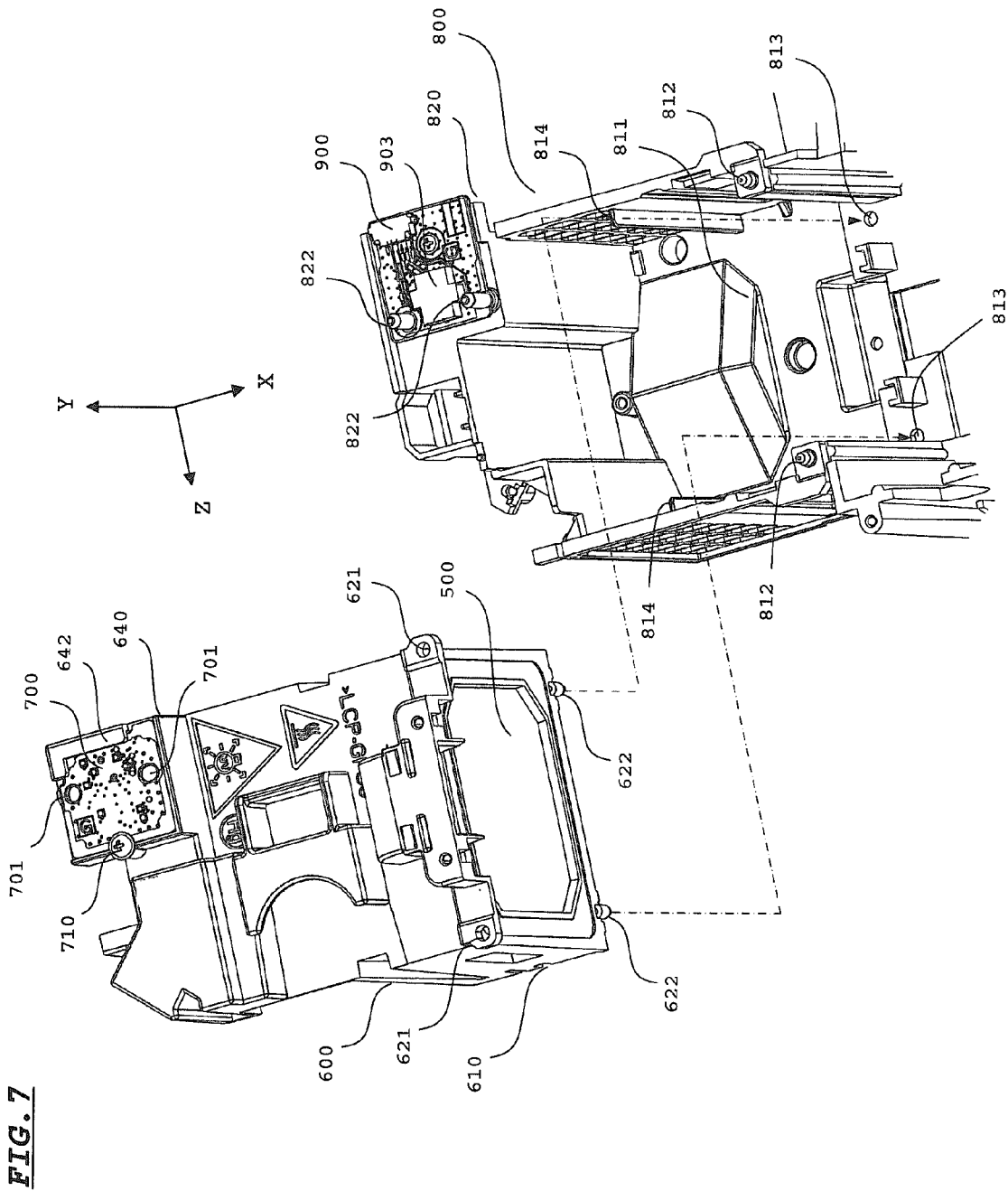
FIG. 7 is a perspective view for describing a method for attachment of the lamp unit in the embodiment.

Returning to FIG. 4, the holder housing 800 includes a box attachment part 811 that is open on front and upper sides. The box 610 of the lamp holder 600 is attached to the box attachment part 811. The box attachment part 811 has, on an upper front side, pins 812 respectively engaging with the two holes 621 of the lamp holder 600. The box attachment part 811 also has, on a front bottom side, holes 813 (not shown in FIG. 4. Refer to FIG. 7) respectively engaging with the two pins 622 of the lamp holder 600. The box attachment part 811 further has a pair of vertically extending guides 814 that lock the rear surface of the box 610 and guide the lamp holder 600 when the lamp holder 600 is attached. The box attachment part 811 has on two walls a ventilation opening 815 that allows winds to pass through the box attachment part 811.

The holder housing 800 has a board holding part 820 that is opposed to the board holding part 640 of the lamp holder 600 when the lamp holder 600 is attached.

FIG. 5B is an enlarged view of the board holding part 820. The board holding part 820 has a concave 821, two pins 822 projecting from the concave 821, and a screw hole 823. The board holding part 820 also has a notch 824 near the screw hole 823 on a wall surrounding the concave 821.

The circuit board 900 has a notch 901 and a hole 902, which engage with the two pins 822 on the board holding part 820. The circuit board 900 also has on an upper surface a connector 903 that connects with the connector 706 on the circuit board 700 disposed in the lamp holder 600, and a connector 904 that connects the connector 903 electrically to the main board. The circuit board 900 can be attached to the board holding part 820 by screwing the screw 905 into the screw hole 823.

Returning to FIG. 4, for mounting the lamp unit, first the lamp 500 is attached to the box 610 of the lamp holder 600. Then, the circuit board 700 is attached to the board holding part 640 of the lamp holder 600. Referring to FIG. 5A, the circuit board 700 can be attached by placing the circuit board 700 on the placement part 644 while fitting the notches 703 and 704 into the L-shaped locking part 642, and then screwing the screw 710 into the screw hole 643. At the time, the screw 710 is screwed into the screw hole 643 in such a manner that a slight clearance is left between the screw head and the upper surface of the circuit board 700. Accordingly, the circuit board 700 can be attached to the board holding part 640 so as to be displaceable only by a predetermined stroke in the X- and Z-axis directions.

Returning to FIG. 4, the circuit board 900 is attached to the board holding part 820 in the main unit chassis. Referring to FIG. 5B, for attachment of the circuit board 900, the circuit board 900 is placed on the notch 824 and on seats 822a at a base of the two pins 822 while the notch 901 and the hole 902 are fitted to the two pins 822, respectively. An upper surface of the seat 822a and an upper surface of the notch 824 are at the same height. Subsequently, the screw 905 is screwed into the screw hole 823.

Here, the notch 901 and the hole 902 are engaged with the pins 822 with almost no play. Accordingly, when being placed on the notch 824 and the seats 822a at the base of the pins 822 as stated above, the circuit board 900 is positioned in the X- and Z-axis directions with respect to the board holding part 820. In addition, the screw 905 is screwed into the screw hole 823 until the screw 905 is pressurized and brought into contact with the upper surface of the circuit board 900. This allows the circuit board 900 to be incapable of being displaced also in the Y-axis direction and thus be positioned in the Y-axis direction.

FIG. 7 is a diagram of the lamp unit in which the two circuit boards 700 and 900 are attached to the board holding parts 640 and 820, respectively. Subsequently, the lamp holder 600 is mounted to the holder housing 800 by pushing the box 610 into the box attachment part 811 while bringing the rear surface of the box 610 into contact with the guides 814.

A distance from a front inner side of the box attachment part 811 to the guides 814 is made slightly larger than a length of the box 610 in the X-axis direction. Accordingly, the lamp holder 600 can be housed in the holder housing 800 in a predetermined position by pushing the box 610 into the box attachment part 811 while bringing the rear surface of the box 610 into contact with the guides 814.

When the lamp holder 600 is pushed into the box attachment part 811 as stated above, ends of the two pins 812 on the holder housing 800 side are inserted into the two holes 621 of the lamp holder 600 side, and ends of the two pins 622 on the lamp holder 600 side are inserted into the two holes 813 of the holder housing 800, before the lamp holder 600 reaches the predetermined position in the holder housing 800. At the same time, ends of the two pins 822 extending from the board holding part 820 are inserted into the two holes 701 of the circuit board 700.

Here, the pins 812 and 622 each have a tapered end, and therefore, when the lamp holder 600 is further pushed into the box attachment part 811, the lamp holder 600 is guided by the inclined ends of the pins 812 and 622 and then is placed into the predetermined position. Accordingly, the light axis of the lamp 500 attached to the lamp holder 600 is properly set with respect to a subsequent optical system.

In addition, the pins 822 have inclines 822b at tapered ends (refer to FIG. 5B). Therefore, when the lamp holder 600 is further pushed into the box attachment part 811 with the pins 822 inserted into the holes 701, the circuit board 700 is guided and displaced in the X- and Z-axis directions by the inclines 822b at the pin 822 ends. Accordingly, the connector 706 on the circuit board 700 is properly opposed to the connector 903 on the circuit board 900, and then the lamp holder 600 is further pushed to connect the connectors 706 and 903.

FIG. 8A is a diagram of the lamp unit in which the lamp holder 600 is pushed completely into the box attachment part 811. FIG. 8B is a perspective view of the vicinities of the board holding 640 and 820. FIG. 8C is a perspective view similar to that in FIG. 8B except that the board 700 removed.

As shown in FIGS. 8A to 8C, when the lamp holder 600 is pushed completely into the box attachment part 811, the lamp 500 is properly positioned, and the connector 706 on the circuit board 700 and the connector 903 on the circuit board 900 are connected to each other.

Figure 9:
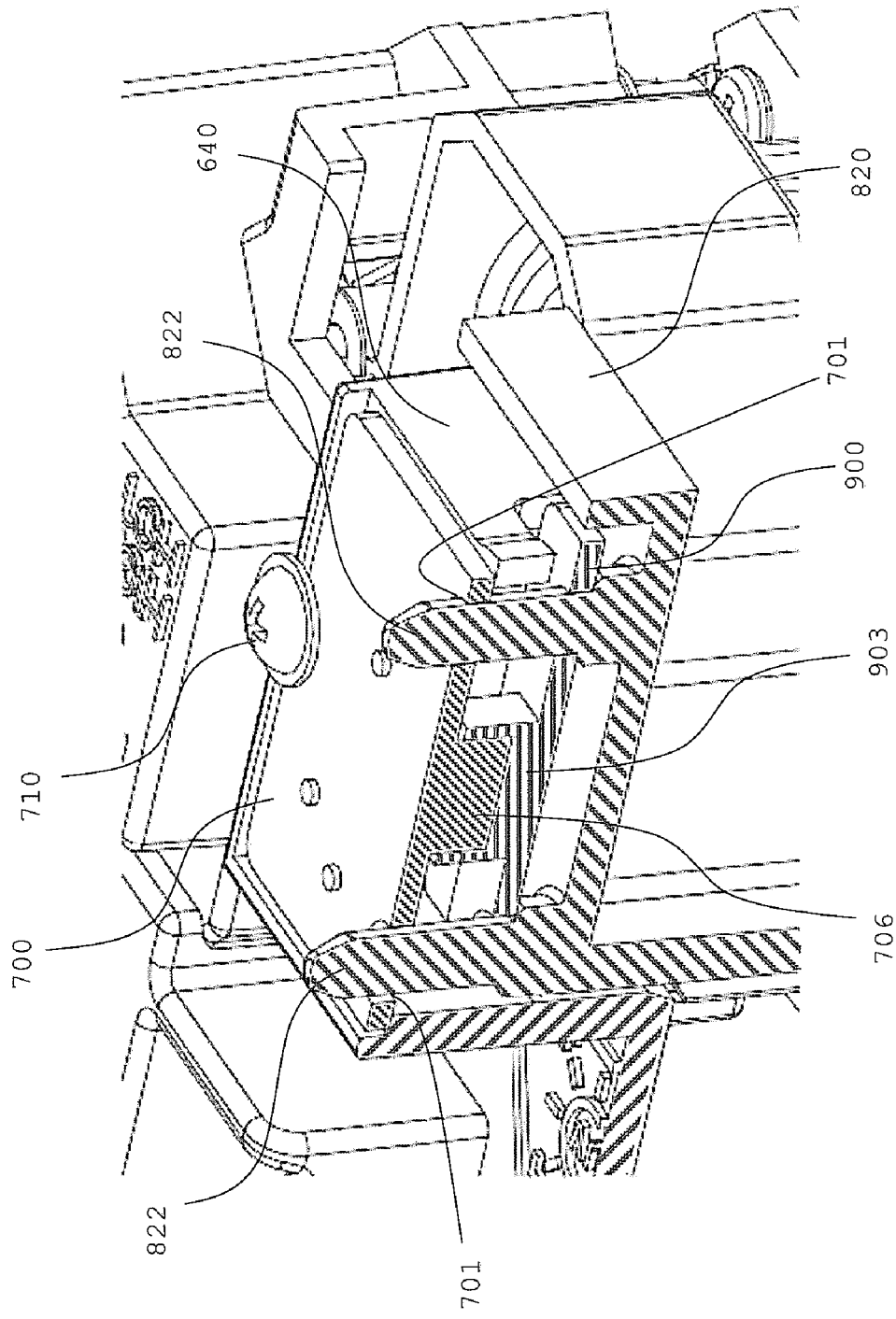
FIG. 9 is a partial cross section view of the attached lamp unit in the embodiment.

FIG. 9 is a cross section view of the diagram in FIG. 8B along a line A-A'. Length of the pins 822 is designed such that portions of the pins 822 further at the base than the ends thereof are fitted into the holes 701 of the circuit board 700, before the connector 903 on the circuit board 900 are connected to the connector 706 on the circuit board 700. Accordingly, when starting to connect with each other, the connectors 706 and 903 are completely positioned, thereby allowing smooth connection between the connectors 706 and 903.

Figure 10:
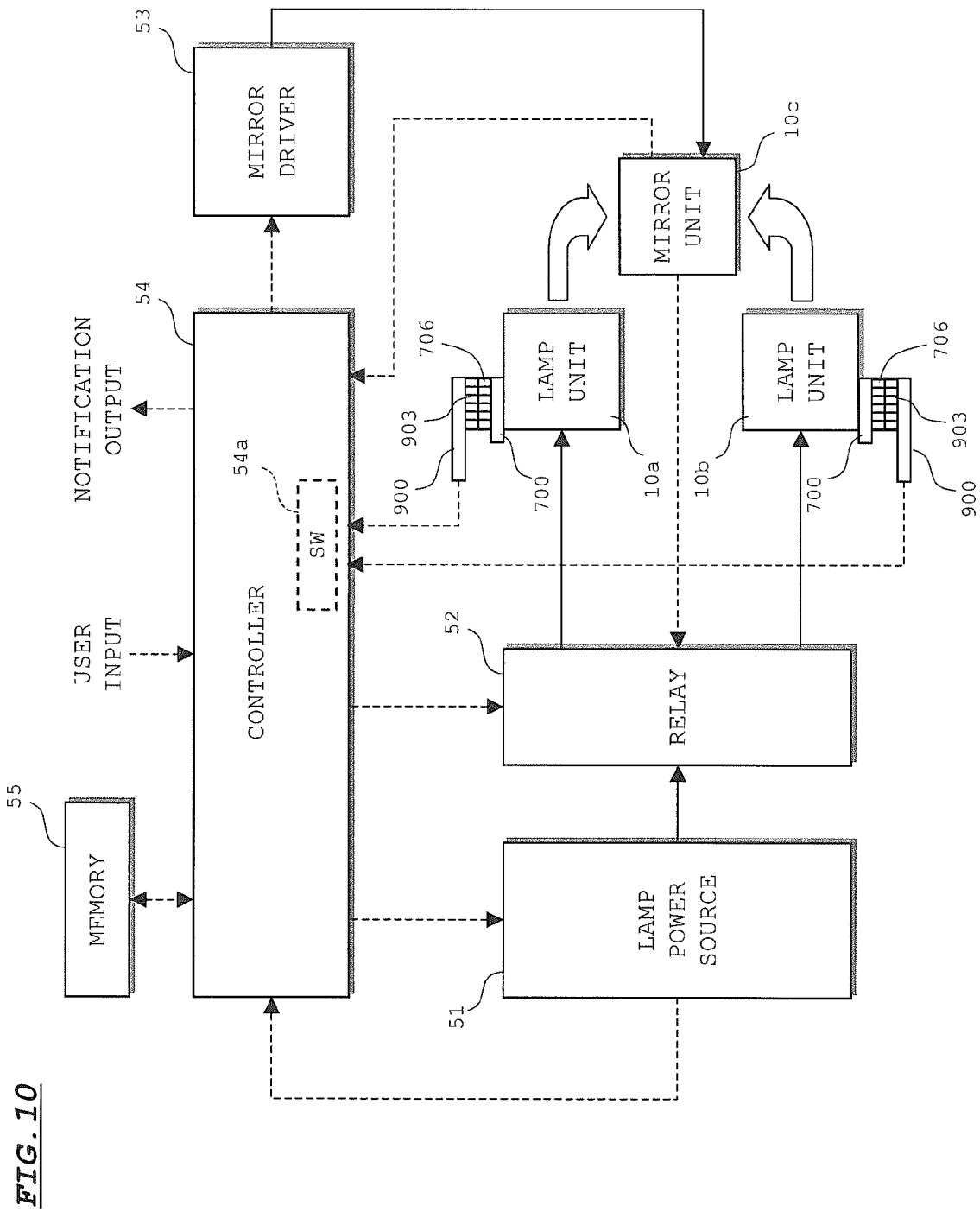
FIG. 10 is a diagram showing a circuit configuration of a projector in the embodiment.

FIG. 10 illustrates a circuit configuration of a projector in this embodiment. FIG. 10 shows only a configuration related to the lamp units 10a and 10b and the mirror unit 10c, and other configurations are omitted.

A lamp power source 51 supplies power for driving a lamp to a relay circuit 52 in accordance with a control signal from a controller 54. The lamp power source 51 also monitors a voltage applied to the lamp 500 to thereby determine whether the lamp is on, and provides a result of the determination to the controller 54. Specifically, the lamp power source 51 provides the controller 54 with a determination that the lamp is on when the applied voltage is below a predetermined threshold, and provides the controller 54 with a determination that the lamp is off when the applied voltage is above the predetermined threshold.

The relay circuit 52 supplies the power from the lamp power source 51 to either one of the lamp units 10a and 10b which is designated by the controller 54. The relay circuit 52 receives signals from the detection switches 301 and 302 disposed on the mirror unit 10c. When the mirror 201 in the mirror unit 10c is directed toward the lamp unit 10a, the detection switch 301 is turned on and an ON signal from the detection switch 301 is input to the relay circuit 52. On the other hand, when the mirror 201 is directed toward the lamp unit 10b, the detection switch 302 is turned on and an ON signal from the detection switch 302 is input to the relay circuit 52.

The relay circuit 52 is configured so as not to supply the power from the lamp power source 51 to the lamp unit 10a if the detection switch 301 has not input an ON signal even though the controller 54 has input a control signal for power supply to the lamp unit 10a; and so as not to supply the power from the lamp power source 51 to the lamp unit 10b if the detection switch 302 has not input an ON signal even though the controller 54 has input a control signal for power supply to the lamp unit 10b.

A mirror driver 53 drives the mirror unit 10c in accordance with a control signal from the controller 54. At driving of the mirror unit 10c, the controller 54 monitors signals from the detection switches 301 and 302 disposed in the mirror unit 10c. Then, after the detection switch located in a driving direction has input an ON signal, the controller 54 provides a control signal to the mirror driver 53 to further drive the mirror 201 in the driving direction for a specific period of time. Accordingly, the mirror 201 can be reliably situated in a desired switch position.

When such control has been exercised, the motor 404 is continuously driven even after the rear surface of the mirror holder 200 has contacted the adjustment plate 203. In this case, however, the torque limiter 402 absorbs a driving force of the motor 404 as stated above, and therefore there arises no problem such as damage to the motor 404 under an overload or an angular shift of the mirror 201 due to a skew in the mirror holder 200.

The controller 54 includes a CPU (not shown) and a switch 54a, and controls the components according to pre-loaded control programs. The switch 54a connects either one of the circuit parts 705 disposed on the lamp units 10a and 10b to a data bus in the controller 54. The controller 54 switches the switch 54a so as to establish a communication path with either one of the circuit parts 705 disposed on the lamp units 10a and 10b. Then, the controller 54 acquires lamp management information from the circuit part 705 via the communication path, and stores the acquired management information in a memory 55. The controller 54 receives various instructions from the user via the remote.

A configuration and a control operation relating to communications between the controller 54 and the circuit parts 705 disposed on the lamp units 10a and 10b will be described later in detail with reference to FIGS. 11A to 11C, and 12.

In the configuration of FIG. 10, if a lamp to be used is switched from one lamp to the other lamp, the controller 54 causes the lamp power source 51 to stop power supply, and provides a control signal to the mirror driver 53 to rotate the mirror 201 into a position where light from the other lamp is reflected. Accordingly, the mirror 201 is rotated.

Afterward, when the mirror 201 has been rotated into the proper position, either one of the detection switches 301 and 302 provides an ON signal to the controller 54. After a lapse of the specific period of time since the reception of the ON signal, the controller 54 outputs a control signal to the lamp power source 51 to start power supply. At the same time, the controller 54 outputs a control signal to the relay circuit 52 to supply power to the other lamp. Accordingly, the other lamp is turned on for projection of an image.

Next, a configuration of lamp operation by the controller 54 will be described below with reference to FIGS. 11A to 11C.

FIG. 11A is a block diagram of a system including the controller 54 and the circuits 705; FIG. 11B is a diagram showing contents of lamp management information stored in the storage parts 71a and 71b; and FIG. 11C is a diagram showing a configuration of usage history data in the lamp management information. FIG. 11A omits the connectors 706 and 903 intervening between the switch 54a and the circuits 705, and the intermediate circuit board 900.

As shown in FIG. 11A, the circuit parts 705 on the lamp units 10a and 10b include control parts 70a and 70b and the storage parts 71a and 71b. The control parts 70a and 70b control writing/reading of data into/from the storage parts 71a and 71b. The storage parts 71a and 71b store data shown in FIG. 11B as lamp management information.

Here, lamp identification information contains cumulative time data and usage history data. Cumulative time data refers to data indicative of cumulative operating time of the lamp 500. The "cumulative operating time" refers to a total amount of operating time of the lamp 500 after manufacture, which includes the total amount of illuminating time from the first use after manufacture until the present time.

The usage history data contains a flag for a semi-malfunction and a flag for a complete malfunction, as shown in FIG. 11C. Here, the flag for a semi-malfunction is set at "1" if the lamp 500 has failed to illuminate once in the past, and is set at "0" if the lamp 500 has never failed to illuminate. The flag for a complete malfunction is set at "1" if the lamp 500 has been determined as being completely malfunctioning (inoperable)

because of two illumination failures in the past, and is set at "0" in cases other than the foregoing.

That is, the semi-malfunction refers to a state of the lamp 500 having failed to illuminate once in the past, and the complete malfunction refers to a state of the lamp 500 having failed to illuminate twice (that is, having failed to illuminate once more in the semi-malfunctioning state).

Returning to FIG. 11A, the controller 54 includes a communication control part 61; a storage part 62; an on/off detection part 63; a time measurement part 64; a calculation part 65; a lamp operation part 66; a life determination part 67; and a malfunction determination part 68.

The communication control part 61 switch-controls the switch 54a so as to establish a communication path with either one of the circuit parts 705 disposed on the lamp units 10a and 10b. Then, the communication control part 61 acquires the lamp management information from the storage part 71a or 71b in the circuit part 705 with which the communication path is established.

The storage part 62 stores the lamp management information acquired by the communication control part 61. The lamp management information stored in the storage part 62 is updated as needed in processes performed by the calculation part 65 and the malfunction determination part 68 upon the use of the lamp. The storage part 62 sets a storage region for the lamp management information in the memory 55. The storage part 62 stores information necessary for lamp operation such as manual setting data and automatic setting data described later, as well as the lamp management information.

The on/off detection part 63 determines on illumination start and illumination end of the lamp 500 as a target of illumination, on the basis of a result of the determination on lamp illumination provided by the lamp power switch 51. Specifically, while the lamp 500 is being driven, the on/off detection part 63 detects that the lamp 500 has started illumination at the instant when the lamp power source 51 has provided a determination that the lamp 500 is on, and then the on/off detection part 63 detects that the lamp 500 has ended illumination at the instant when the lamp power source 51 has provided a determination that the lamp 500 is off. If the lamp 500 has ended illumination at switching of the lamp 500 or at termination of a projection process, the on/off detection part 63 detects that the lamp 500 has gone off at the instant when power supply to the lamp 500 has been stopped.

The time measurement part 64 starts time measurement upon reception of an illumination start signal from the on/off detection part 63, and passes a result of the measurement to the calculation part 65 at specific time intervals. In addition, the time measurement part 64 terminates time measurement upon reception of an illumination end signal from the on/off detection part 63, and passes a result of the measurement at the time of the termination to the calculation part 65.

The calculation part 65 updates the cumulative time data on the basis of the cumulative time data in the lamp management information stored in the storage part 62 and the result of measurement of elapsed time input from the time measurement part 64, and writes the updated cumulative time data back into the storage part 62. The updated cumulative time data is written as needed back into the storage part 71a or 71b in the corresponding lamp unit 10a or 10b.

The lamp operation part 66 performs lamp illumination control in according with settings made by the user. Details on the illumination control will be described later with reference to FIG. 16A and subsequent diagrams. The lamp operation part 66 includes a mode setting part 66a for mode setting in the lamp illumination control. A lamp operation mode can be set from a user menu projected by the mode setting part 66a.

That is, the mode setting part 66a holds in advance the user menu for mode selection. In mode setting, the user menu is projected via the lamp operation part 66 to allow the user to select a desired lamp operation mode using the remote. A result of the selection is held in the mode setting part 66a. The lamp operation part 66 performs lamp illumination control in accordance with the lamp operation mode held in the mode setting part 66a.

The life determination part 67 holds in advance a reference lifetime of a lamp to be attached, and determines that the lamp has reached the end of the life when the cumulative operating time of the lamp has exceeded the reference lifetime. When the lamp units 10a and 10b are attached, the life determination part 67 refers to the cumulative operating time held in each of the lamp units 10a and 10b to thereby determine whether the life of the lamp is left, and holds a result of the determination (life flag). In addition, during lamp illumination, the life determination part 67 refers to the cumulative time data updated as needed at the calculation part 65 to thereby determine whether the lamp to be used has reached the end of the life, and updates a result of the determination (life flag) as needed.

The malfunction determination part 68 determines on the status of operation of the lamp as a target of illumination (normal/semi-malfunction/complete malfunction) on the basis of the usage history data in the lamp management information stored in the storage part 62 and results of the detection of illumination start and illumination end input from the on/off detection part 63, and updates the usage history data stored in the storage part 62 depending on a result of the determination. The updated usage history data is written back as needed into the storage part 71a or 71b in the corresponding lamp unit 10a or 10b. A process performed by the malfunction determination part 68 will be described later with reference to FIGS. 14 and 15.

Lamp operation control in the system configuration shown in FIG. 11A will be described below.

Figure 12A:
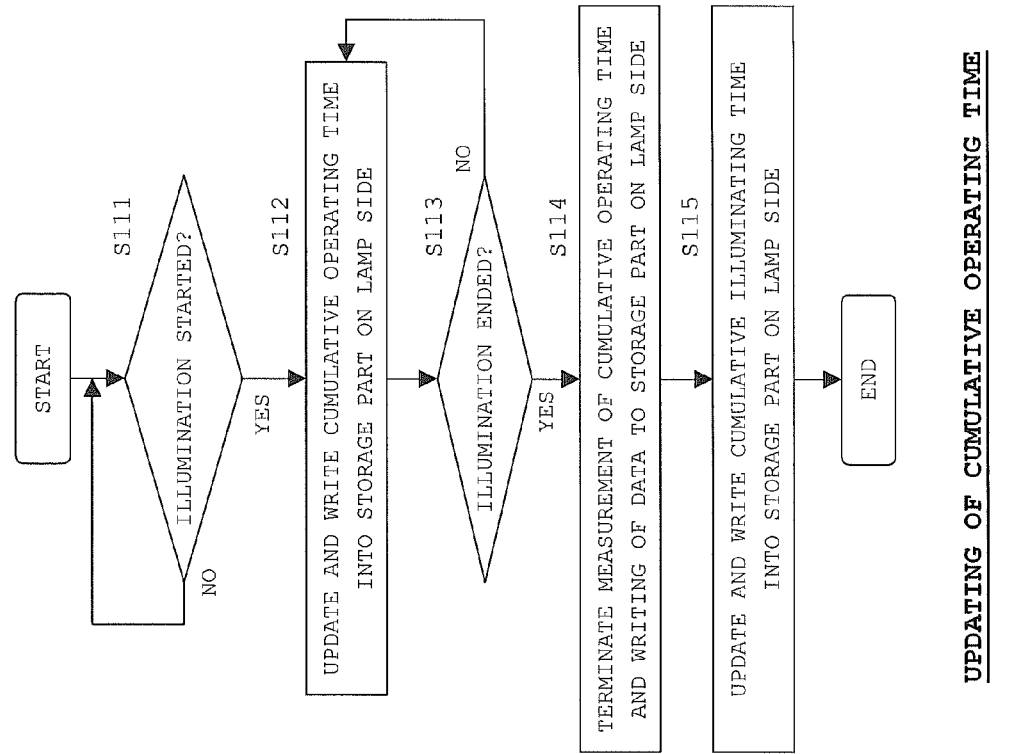
FIGS. 12A and 12B are flowcharts of an initializing process of lamp management information and an updating process of cumulative operating time in the embodiment.

First, referring to FIG. 12A, initialization of the lamp management information will be explained.

When the projector is powered on, lamp management information is acquired from each of the attached lamp units in sequence.

If lamp management information is to be acquired from the lamp unit 10a (S101:YES), the communication control part 61 establishes a communication path with the circuit part 705 in the lamp unit 10a (S102). Then, the communication control part 61 conducts communications with the circuit part 705 with which the communication path is established (S103) to thereby read the lamp management information from the storage part 71a in the circuit part 705 (S104), and then initializes a lamp management information storage region for the lamp unit 10a in the storage part 62, on the basis of the read lamp management information (S105). If the lamp management information is to be acquired from the lamp unit 10b (S101:YES), the communication control part 61 establishes a communication path with the circuit part 705 in the lamp unit 10b (S102), and then initializes a lamp management information storage region for the lamp unit 10a in the storage part 62 through operations of S103 to S105.

Figure 12B:
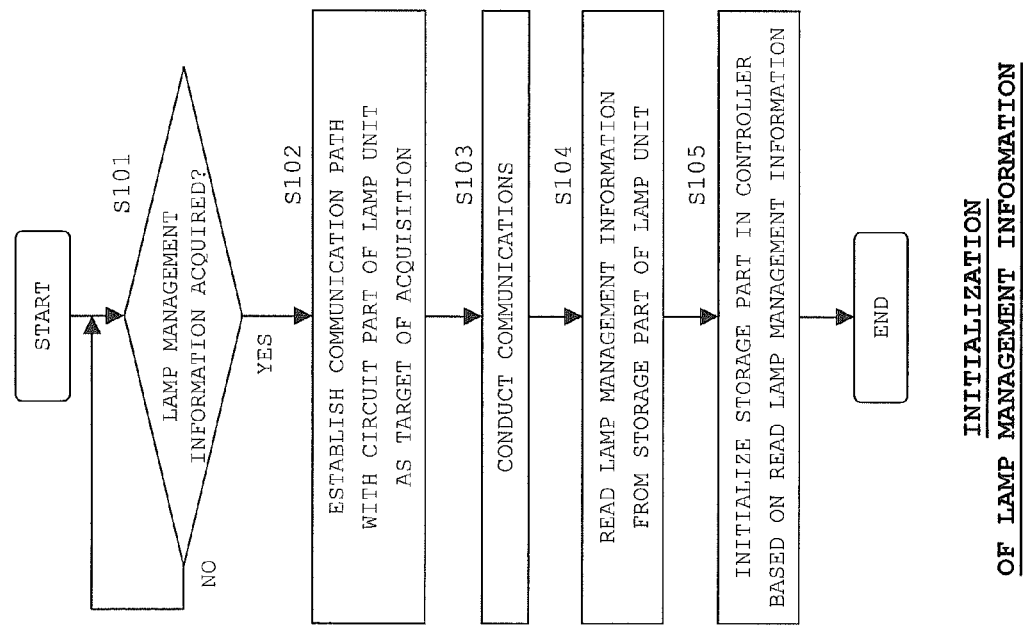

Next, updating of the cumulative time data will be described below with reference to FIG. 12B. Such a process of updating the cumulative time data is executed whenever either one of the lamp units 10a and 10b is turned on.

When the lamp unit 10a or 10b as a target of illumination is turned on (S111:YES), the time measurement part 64 starts to measure elapsed time. At the same time, the calculation part 65 updates the cumulative operating time of the lamp unit 10a or 10b on the basis of the time measured by the time measurement part 64 and the cumulative time data stored in the storage part 62. Then, the calculation part 65 writes the updated cumulative operating time as needed over the previous data in the storage part 62, and writes the same back into the storage part 71a or 71b in the lamp unit 10a or 10b (S112).

Such an update on the cumulative operating time is maintained until the lamp unit 10a or 10b ends illumination (S113: YES). When the lamp unit 10a or 10b ends illumination (S113: YES), the time measurement part 64 and the calculation part 65 terminate the measurement of elapsed time and the calculation of cumulative operating time (S114), and then the cumulative operating time at the time is written back into the storage part 71a or 71b in the lamp unit 10a or 10b (S115). This completes the process.

Figure 13:
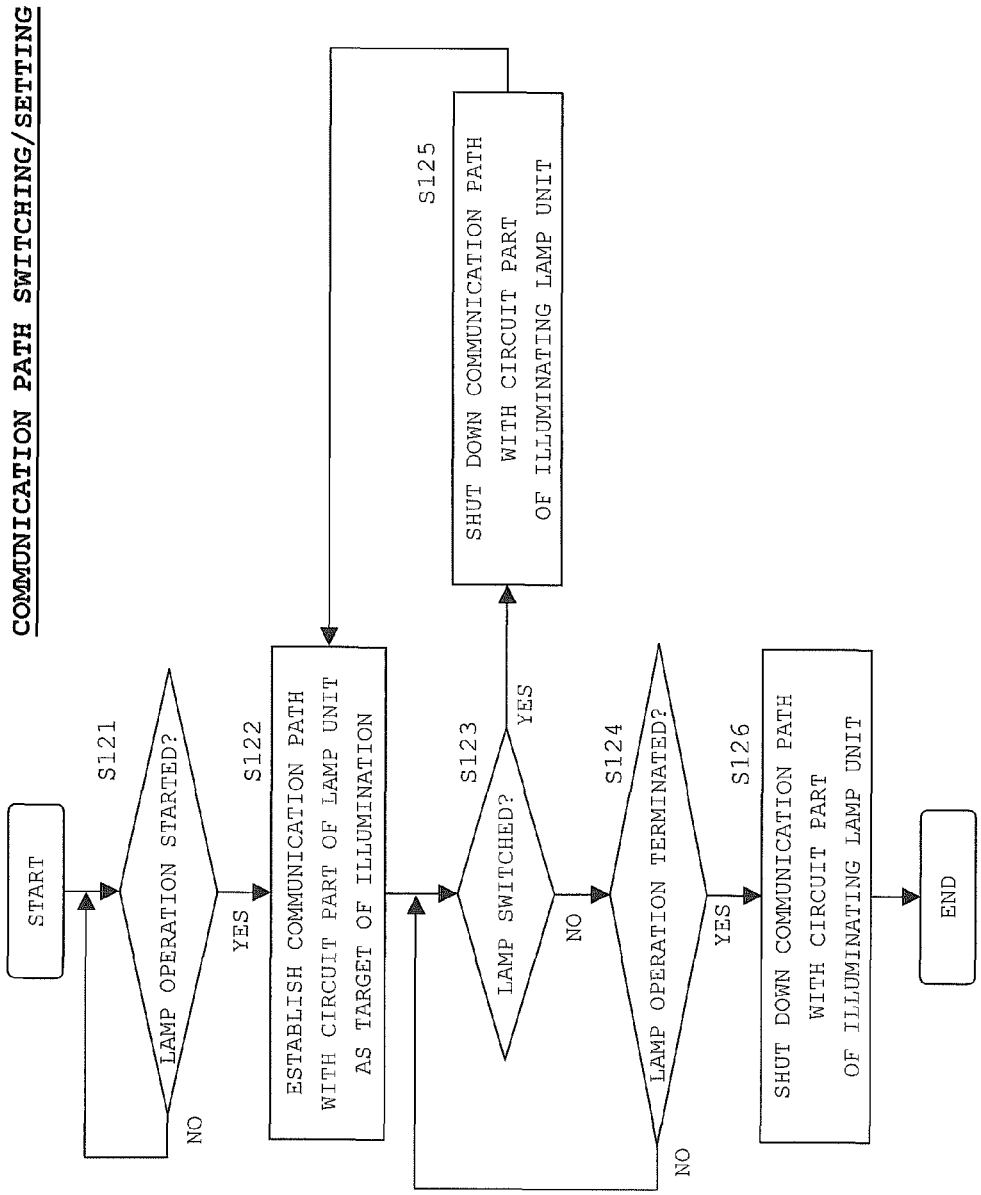
FIG. 13 is a flowchart of a switching and setting process of a communication path in the embodiment.

FIG. 13 is a flowchart of a switching/setting process of a communication path in situation where lamp switching takes place during a lamp operation.

When the lamp operation is started for image projection (S121: YES), the communication control part 61 establishes a communication path with the circuit part 705 in the lamp unit 10a or 10b as a target of illumination (S122). Such a communication path is maintained until the lamp to be used is switched (S123: YES) or the lamp operation (projection process) is terminated (S124: YES).

In the course of the lamp operation, when the lamp to be used is switched by the user's switching operation, the communication control part 61 shuts down the communication path with the circuit part 705 in the illuminating lamp unit (S125), and then establishes a communication path with the circuit part 705 in a lamp unit as a new target of illumination (S122). In addition, when the lamp operation (projection process) is terminated (S124: YES), the communication control part 61 shuts down the communication path with the circuit part 705 in the illuminating lamp unit (S126).

Next, a process for determination on a lamp malfunction will be described below with reference to FIGS. 14 and 15.

Malfunction Determination at Lamp Start-Up

Figure 14:
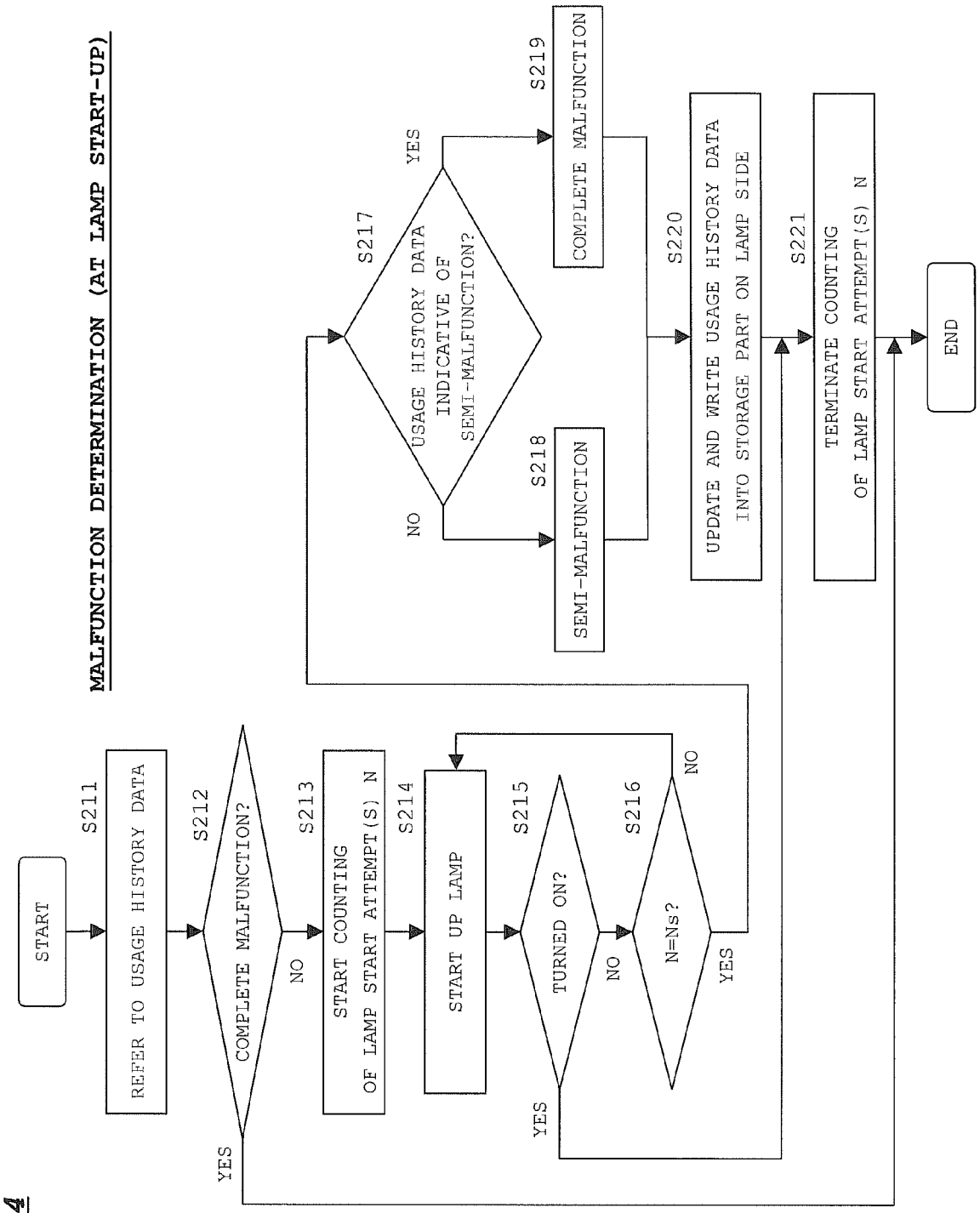
FIG. 14 is a flowchart of a malfunction determination process (at start-up) in the embodiment.

FIG. 14 is a flowchart of a malfunction determination process at lamp start-up.

Prior to the lamp start-up, the lamp operation part 66 and the malfunction determination part 68 refer to the usage history data of the lamp unit to be used, which is stored in the storage part 62 (S211). Here, if the usage history data indicates a complete malfunction (complete malfunction flag=1) (S212: YES), the lamp operation part 66 does not turn the lamp on. In this case, the malfunction determination part 68 does not update the usage history data.

If the usage history data does not indicate a complete malfunction (S212: NO) (complete malfunction flag=0), the lamp operation part 66 starts to count the number of lamp start attempt(s) N (S213), and afterward, increments the number of lamp start attempt(s) N by 1 whenever start-up of the lamp to be used is attempted (S214). Further, the lamp operation part 66 determines whether the on/off detection part 63 has detected an illumination start in response to such lamp start attempt (S215).

If the lamp starts illumination at a first attempt (S215: YES), the lamp operation part 66 terminates counting the number of lamp start attempt(s) N (S221). This completes the malfunction determination at lamp start-up. In this case, the malfunction determination part 68 does not update the usage history data.

If the lamp does not start illumination at the first attempt (S215: NO), the lamp operation part 66 repeats lamp start attempts until the number of lamp start attempt (s) N reaches the predetermined number of times Ns (S216). If the lamp starts illumination in the meantime (S215: YES), the lamp operation part 66 terminates counting the number of lamp start attempt(s) N (S221). This completes the malfunction determination at lamp start-up. In this case, the malfunction determination part 68 does not update the usage history data.

On the other hand, if the lamp does not start illumination even when the number of lamp start attempts has reached Ns (S216: NO), the result is notified to the malfunction determination part 68. Upon receipt of this notification, the malfunction determination part 68 determines whether the usage history data of the lamp unit indicate a semi-malfunction (complete malfunction flag=0, semi-malfunction flag=1) (S217).

If the data does not indicate a semi-malfunction (S217: NO), the malfunction determination part 68 regards the lamp unit as being semi-malfunctioning (S218), updates the usage history data stored in the storage part 62, and further writes the updated usage history data over the previous data in the storage part 71a or 71b of the corresponding lamp unit via the communication control part 61 (S220).

In contrast, if it is determined at S217 that the data indicates a semi-malfunction (S217: YES), the malfunction determination part 68 regards the lamp unit as being completely malfunctioning (S219), updates the usage history data stored in the storage part 62, and further writes the updated usage history data over the previous data in the storage part 71a or 71b of the corresponding lamp unit via the communication control part 61 (S220).

Upon completion of updating of the usage history data as described above, the lamp operation part terminates the counting of the number of lamp start attempt(s) N (S221). This completes the malfunction determination at lamp start-up.

Malfunction Determination During Lamp Illumination

Figure 15:
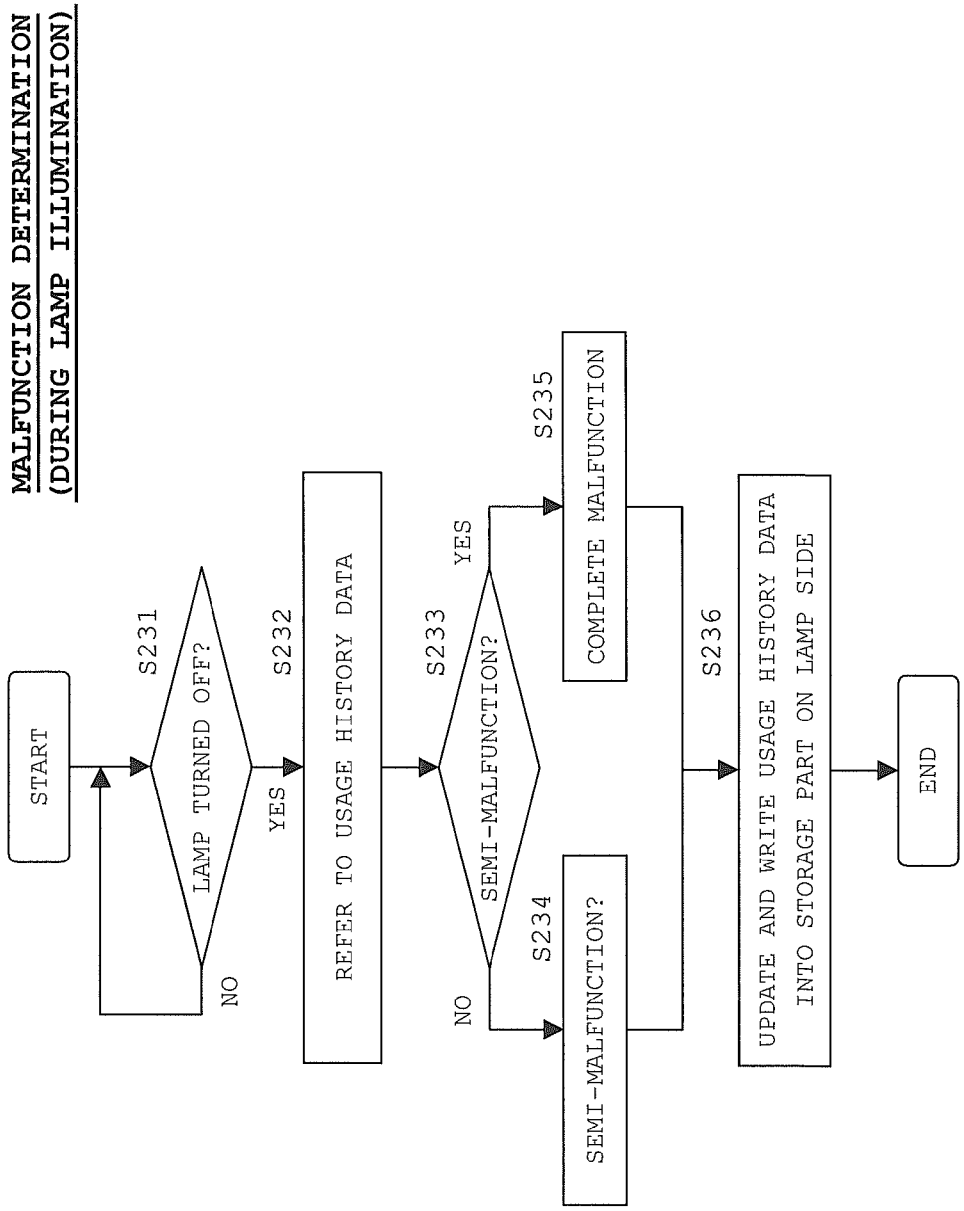
FIG. 15 is a flowchart of a malfunction determination process (during illumination) in the embodiment.

FIG. 15 is a flowchart of a malfunction determination process during lamp illumination.

If the lamp is turned off during illumination of the lamp unit (S231: YES), the malfunction determination part 68 refers to the usage history data of the lamp (S232) to thereby determine whether the usage history data of the lamp unit indicates a semi-malfunction (complete malfunction flag=0, semi-malfunction flag=1) (S233).

If it is not determined that the data indicates a semi-malfunction (S233: NO), the malfunction determination part 68 regards the lamp unit as being semi-malfunctioning (S234), updates the usage history data stored in the storage part 62, and further writes the updated usage history data over the previous data in the storage part 71a or 71b of the corresponding lamp unit via the communication control part 61 (S236). This completes the malfunction determination during lamp illumination.

In contrast, if it is determined at S233 that the data indicates a semi-malfunction (S233: YES), the malfunction determination part 68 regards the lamp unit as being completely malfunctioning (S235), updates the usage history data stored in the storage part 62, and further writes the updated usage history data over the previous data in the storage part 71a or 71b of the corresponding lamp unit via the communication control part 61 (S236). This completes the malfunction determination during lamp illumination.

Next, lamp switching control in this embodiment will be described below.

Available as lamp switching modes in this embodiment are a manual switching mode; an automatic switching mode; a life priority mode; and a continuation priority mode. The user is allowed to select between the manual switching mode and the automatic switching mode, and also to select between the life priority mode and the continuation priority mode, by performing external manipulation as appropriate.

When the projector is set in the manual switching mode or the automatic switching mode, the life priority mode or the continuation priority mode is implemented in parallel therewith. In the life priority mode or the continuation priority mode, switching of the lamp to be used or stopping of the lamp illumination is carried out depending on the life of the illuminating lamp. Here, a lamp operation in the life priority mode or the continuation priority mode has precedence over a lamp operation in the manual switching mode or the automatic switching mode.

Even if the automatic switching mode is set during implementation of the manual switching mode, mode change takes place but lamp switching does not occur on the projector. In contrast to this, if the manual switching mode is set during implementation of the automatic switching mode, both of mode change and lamp switching may take place. In this case, lamp switching occurs if the lamp selected at time of setting the manual switching mode is different from the lamp illuminating during implementation of the automatic switching mode, whereas lamp switching does not occur if the same lamp is selected as a lamp to be used before and after the mode change.

In this embodiment, the user is allowed to select a lamp to be used at time of setting the manual switching mode. Alternatively, lamp switching may take place from the currently illuminating lamp to the other lamp whenever the manual switching mode is selected.

In addition, the user is allowed to select between the life priority mode and the continuation priority mode at any time during operation of the projector, such as during implementation of the manual switching mode or the automatic switching mode, or before implementation of the manual switching mode or the automatic switching mode.

When the lamp operation (image projection) is terminated or the projector is powered off in any of the foregoing modes, the projector retains the mode settings at the time, and then performs a lamp operation (image projection) in the retained modes next time the lamp operation is started.

In the descriptions below, either one of the lamp unit 10*a* and 10*b* and a lamp attached to the same are designated as lamp 1, and the other lamp unit and a lamp attached to the same are designated as lamp 2, for the sake of convenience.

Manual Switching Mode

First, the manual switching mode will be described with reference to FIGS. 16A and 16B. FIG. 16A shows a process flow in the manual switching mode; and FIG. 16B is a diagram showing a configuration of manual setting data held in the storage part 62 in the manual switching mode.

The manual setting data shown in FIG. 16B constitutes data for specifying which of the lamps 1 and 2 is selected at time of setting the manual switching mode. Here, the lamp with a flag at "1" is selected at setting of the manual switching mode. When the lamp operation is terminated in the manual switching mode, the manual setting data at the time is retained. Afterward, if a lamp operation is started with no lamp selection in the manual switching mode again, the lamp to be used is set in accordance with the retained manual setting data.

Referring to FIG. 16A, when a lamp operation (image projection) is started in the manual switching mode, the lamp operation part 66 refers to the manual setting data stored in the storage part 62 (S311), and specifies the lamp set as a target of illumination. Then, the lamp operation part 66 refers to the usage history data of the thus specified lamp to thereby determine whether the lamp is operable (not completely malfunctioning) (S312).

Here, if the lamp is not operable (S312: NO), the lamp operation part 66 disables the manual switching mode (S313). In this case, that effect is notified to the user by sounds or the like. On the other hand, if the lamp is operable (S312: YES), the lamp operation part 66 turns the lamp on (S314).

After turning the lamp on as stated above, the lamp operation part 66 keeps a watch on whether an instruction for lamp switching is issued from the user (S315) or whether the lamp operation (image projection) is terminated (S316), and continues illumination of the lamp as far as there is no such instruction or termination (S315: NO, S316: NO).

If an instruction for lamp switching is issued from the user during lamp illumination (S315: YES), the lamp operation part 66 turns the lamp off (S317), and updates the manual setting data in such a manner that the other lamp is selected (S318). Then, the lamp operation part 66 carries out S311 and subsequent steps on the basis of the updated manual setting data. This turns the other lamp on (S314).

Afterward, if an instruction for lamp switching is issued from the user again (S315: YES), the lamp operation part 66 switches the illumination lamps as in the foregoing case. Meanwhile, if the lamp operation (image projection) is terminated during lamp illumination (S316), the lamp operation part 66 turns off the illuminating lamp (S319). When the lamp operation has been terminated as stated above, the manual setting data at the time is held in the storage part 62.

Automatic Switching Mode

Next, the automatic switching mode will be described with reference to FIGS. 17A and 17B. FIG. 17A shows a process flow in the automatic switching mode; and FIG. 17B is a diagram showing a configuration of automatic setting data held in the storage part 62 in the automatic switching mode.

Figure 17B:
FIG. 17B is a diagram showing automatic setting data.
Figure 17A:
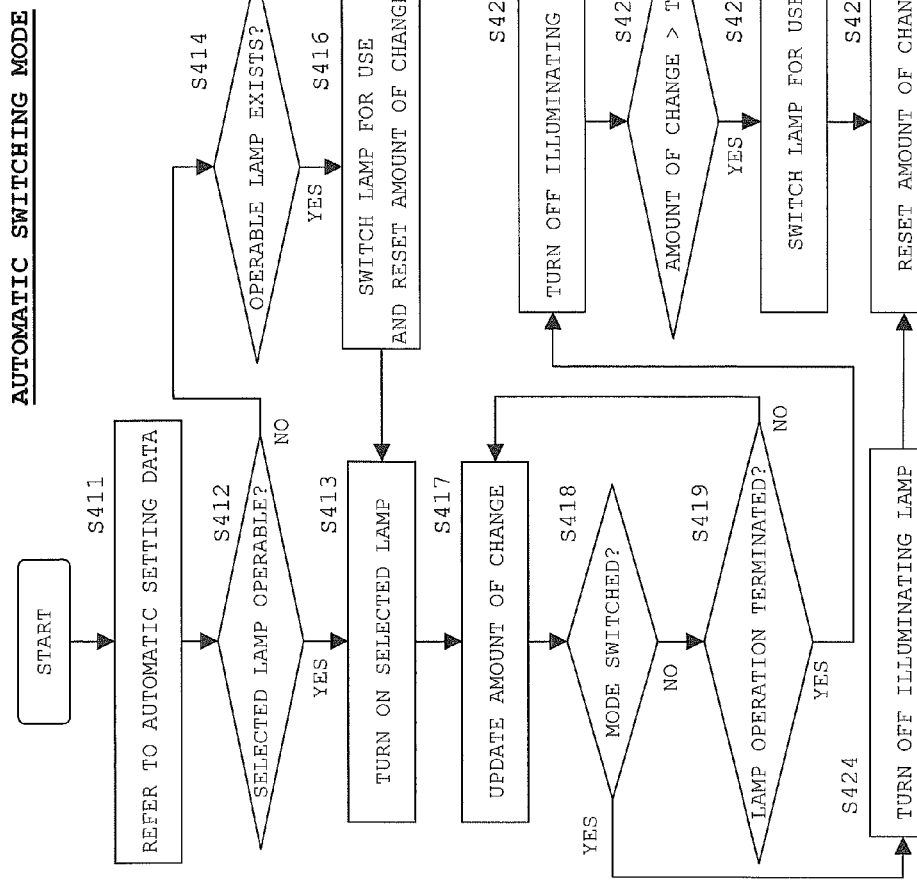
FIG. 17A is a flowchart of a process in an automatic switching mode in the embodiment.

The automatic setting data shown in FIG. 17B constitutes data for specifying which of the lamps 1 and 2 is currently set as an illumination lamp. Here, the lamp with a flag at "1" is currently set as an illumination lamp. Besides, the automatic setting data contains an amount of illuminating time of a lamp from the instant when the lamp has been set as an illumination lamp (the flag has been set at "1") to the present time, as an amount of change.

When the lamp operation is terminated in the automatic switching mode, the automatic setting data is updated on the basis of the amount of change at the time, and is held in the storage part 62. Afterward, when lamp operation is started in the automatic setting mode again, the lamp to be used is set in accordance with the held automatic setting data.

Referring to FIG. 17A, when the lamp operation (image projection) is started in the automatic setting mode, the lamp operation part 66 refers to the automatic setting data stored in the storage part 62 (S411) to thereby specify the lamp set as a target of illumination. Then, the lamp operation part 66 refers to the usage history data of the thus specified lamp to thereby determine whether the lamp is operable (not completely malfunctioning) (S412).

Here, if the lamp is operable (S412: YES), the lamp operation part 66 turns the lamp on (S413). On the other hand, if the lamp is not operable (S412: NO), the lamp operation part 66 refers to the usage history data of the other lamp to thereby determine whether the other lamp is operable (not completely malfunctioning) (S414). Here, if the other lamp is also not operable (S414: NO), the lamp operation part 66 disables the automatic switching mode (S415). In this case, that effect is notified to the user by sounds or the like.

In contrast, if the other lamp is operable (S414: YES), the lamp operation part 66 switches the illumination lamp to the other lamp to turn the other lamp on (S416). At the time, the flag in the automatic setting data is updated in such a manner that the other lamp is set as an illumination lamp. In addition, the amounts of change of the lamps 1 and 2 are reset to zero.

After turning the lamp on as stated above, the lamp operation part 66 updates the amount of change of the illumination lamp as needed in accordance with a measurement result from the time measurement part 64 (S417). The illumination of the lamp and the update on the amount of change are continued until switching to the manual mode takes place (S418: YES) or the lamp operation (image projection) is terminated (S419: YES).

Afterward, when the lamp operation (image projection) is terminated (S419: YES), the lamp operation part 66 turns off the illuminating lamp (S420) and determines whether the amount of change at the time has exceeded predetermined threshold time Ts (S421). Then, if the amount of change has exceeded the threshold time Ts (S421: YES), the lamp operation part 66 updates the flag in the automatic setting data in such a manner that lamp switching will take place from the currently illuminating lamp to the other lamp at a next-time operation in the automatic switching mode (S422). At the same time, the lamp operation part 66 resets the amounts of change of the lamps 1 and 2 to zero. On the other hand, if the amount of change has not exceeded the threshold time Ts (S421: NO), the lamp operation part 66 terminates the process without updating the automatic setting data.

If switching to the automatic mode takes place during lamp illumination (S418: YES), the lamp operation part 66 turns off the illuminating lamp (S424), and resets the amounts of change of the lamps 1 and 2 in the automatic setting data. At the time, the flag in the automatic setting data is not updated. Accordingly, when the automatic switching mode is set next time, the current illumination lamp is turned on again.

FIGS. 18A and 18B are timing charts that exemplify transitions of the automatic setting data for the lamps 1 and 2 in the automatic switching mode. Here, operation is started from the lamp 1. The amount of change of the lamp 1 is zero at operation start.

When a lamp operation is started at t0, the lamp 1 is turned on and the amount of change of the lamp 1 is increased until the lamp operation is terminated at t1. When the lamp operation is terminated at t1, the amount of change of the lamp 1 is smaller than the threshold time Ts. Accordingly, the flags for the lamps 1 and 2 are not updated, and the amount of change of the lamp 1 is held as it is until a lamp operation is started again at t2.

When the lamp operation is started at t2, the lamp 1 is turned on and the amount of change of the lamp 1 is increased. The amount of change of the lamp 1 is increased until the lamp operation is terminated at t3. When the lamp operation is terminated at t3, the amount of change of the lamp 1 exceeds the threshold time Ts. Accordingly, the flags for the lamps 1 and 2 are updated in such a manner that the lamp 2 will be used for a next-time lamp operation. At the same time, the amounts of change of the lamps 1 and 2 are reset to zero.

When the lamp operation is started again at t4, the lamp 2 is turned on, and the amount of change of the lamp 2 is increased until the lamp operation is terminated at t5. When the lamp operation is terminated at t5, the amount of change of the lamp 2 exceeds the threshold time Ts. Accordingly, the flags for the lamps 1 and 2 are updated in such a manner that the lamp 1 will be used for a next-time lamp operation. At the same time, the amounts of change of the lamps 1 and 2 are reset to zero. Afterward, when the lamp operation is started again at t6, the lamp 1 is turned on and the amount of change of the lamp 1 is increased.

Next, the life priority mode and the continuation priority mode will be described below with reference to FIGS. 19 and 20. As stated above, the user is allowed to select either the life priority mode or the continuation priority mode. In addition, the life priority mode and the continuation priority mode are each implemented in parallel with the manual switching mode or the automatic switching mode. Lamp operation in the life priority mode or the continuation priority mode has precedence over a lamp operation in the manual switching mode or the automatic switching mode.

Life Priority Mode

First, the life priority mode will be described with reference to FIG. 19. Here, the life priority mode is implemented during lamp illumination, not at start of lamp illumination.

When the lamp as a target of illumination is turned on, the life determination part 67 refers to the cumulative time data held in the storage part 62 to thereby determine whether the cumulative operating time of the illuminating lamp has exceeded the reference lifetime of the lamp (the remaining life has reached zero) (S501). If the illuminating lamp has reached the end of the life due to repeated illumination (S501: YES), the process moves to S504 for operation of the other lamp.

If the life of the illumination lamp is left (S501: NO), then the lamp operation part 66 determines whether the operational status of the lamp as a target of illumination, determined by the malfunction determination part 68, is changed (normally functioning→semi-malfunctioning or semi-malfunctioning→completely malfunctioning) (S502). If the operational status of the illuminating lamp has changed (S502: YES), the process moves to S505 for operation of the other lamp. If the operational status of the illuminating lamp is not changed (S502: NO), the illumination of the lamp is maintained, and the calculation part 65 updates the cumulative operating time of the illuminating lamp as needed (S503).

When the illuminating lamp reaches the end of the life (S501: YES) or the operational status of the illuminating lamp is changed (S502: YES), the life determination part 67 refers to the cumulative time data held in the storage part 62 to thereby determine whether the cumulative operating time of the other lamp has exceeded the reference lifetime of the lamp (the remaining life has reached zero) (S504). If the other lamp reaches the end of the life (S505: YES), the lamp operation part 66 turns off the illuminating lamp to stop the lamp operation (image projection) (S508).

If the other lamp does not yet reach the end of the life (S505: NO), then the lamp operation part 66 refers to the usage history data of the other lamp, which is held in the storage part 62 (S506), to thereby determine whether the other lamp is completely malfunctioning (S507). Here, if the other lamp is completely malfunctioning (S507: YES), the lamp operation part 66 turns off the illuminating lamp to stop the lamp operation (image projection) (S508).

If the other lamp is not completely malfunctioning (is normally functioning or semi-malfunctioning) (S507: NO), the lamp operation part 66 turns off the illuminating lamp and switches the illumination lamp to the other lamp (S509). At the time, if the automatic switching mode is set in parallel, the lamp operation part 66 changes from the automatic switching mode to the manual switching mode in which the other lamp is operated as an illumination lamp. At the time, the flag for the automatic setting data in the automatic switching mode is not changed, and the amounts of change of the lamps 1 and 2 are reset to zero.

When the other lamp is turned on as stated above, the process returns to S501 for operation of the other lamp. During illumination of the other lamp, the other lamp is determined as needed for life and malfunction as in the foregoing steps (S501 and S502). Then, the other lamp continues to illuminate as far as the other lamp has the life left and does not cause a malfunction. Otherwise, if an instruction for termination of the lamp operation (image projection) is issued, the illumination of the other lamp is terminated in response to this instruction.

Figure 19:
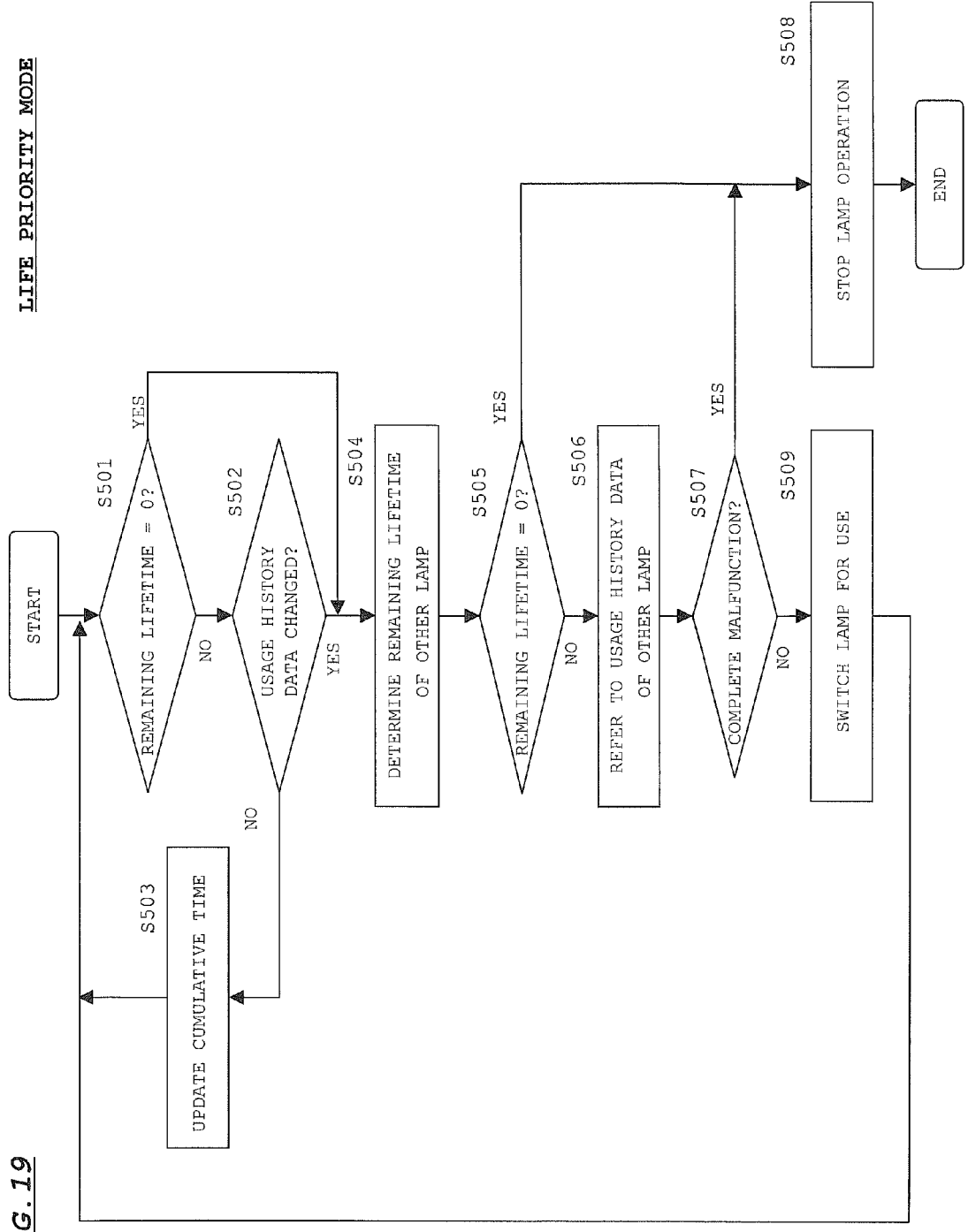
FIG. 19 is a flowchart of a process in a life priority mode in the embodiment.
Figure 20:
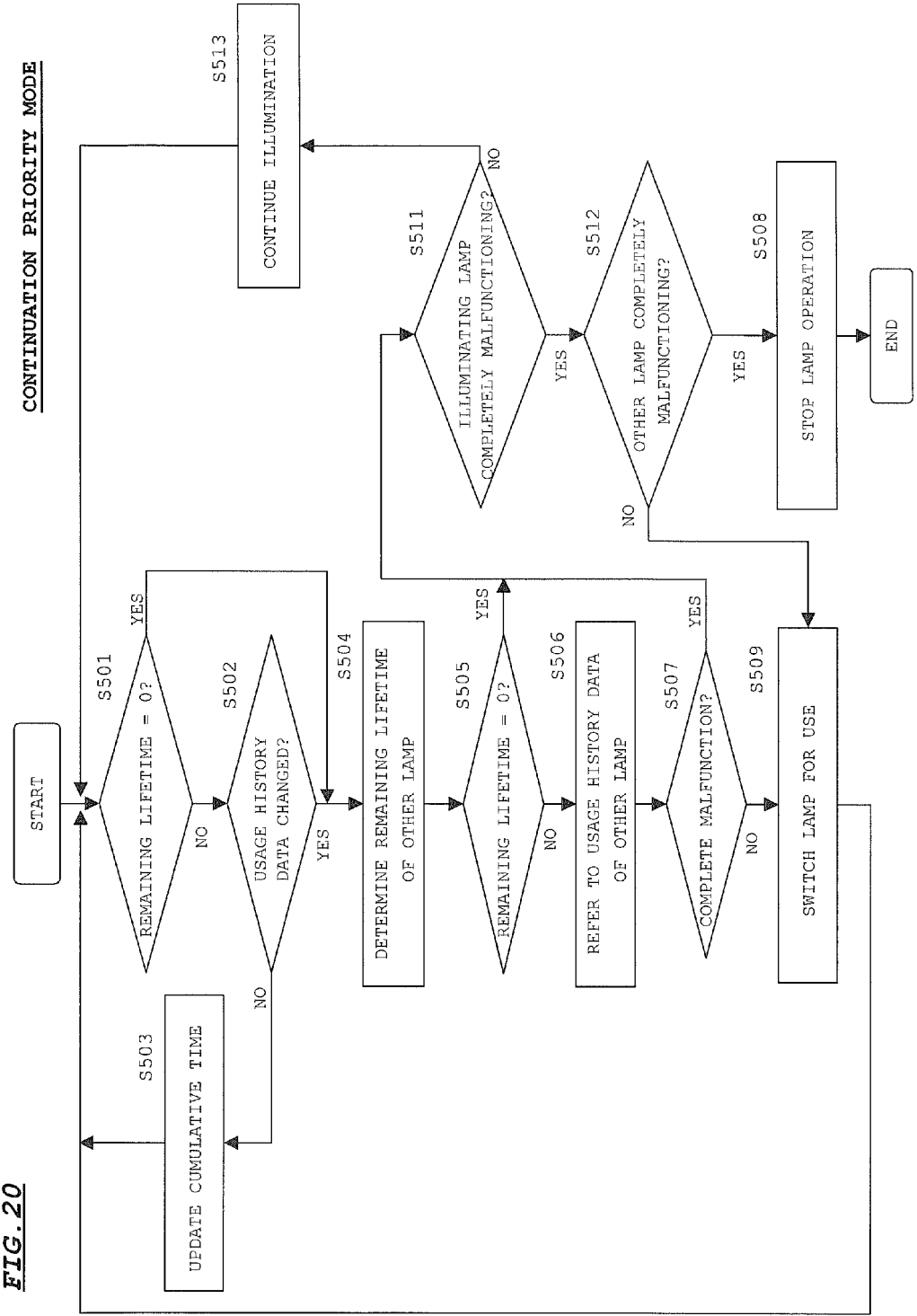
FIG. 20 is a flowchart of a process in a continuation priority mode in the embodiment.

In the process flow of FIG. 19, if it is determined at S507 that the illumination lamp is semi-malfunctioning (S507: YES), the illumination lamp is switched to the other lamp (S509). Alternatively, the illumination lamp may be switched to the other lamp only if the other lamp is normally functioning.

Continuation Priority Mode

Next, the continuation priority mode will be described with reference to FIG. 20. The continuation priority mode is different from the life priority mode shown in FIG. 19, in the process to be performed if it is determined at S505 or S507 that the other lamp has reached the end of the life or the other lamp is completely malfunctioning.

Specifically, if it is determined that the other lamp has reached the end of the life (S505: YES) or the other lamp is completely malfunctioning (S507: YES), the lamp operation part 66 refers to the usage history data stored in the storage part to thereby determine whether the illuminating lamp is completely malfunctioning (S511). Here, if the illuminating lamp is not completely malfunctioning (S511: NO), the lamp operation part 66 continues the illumination of the illuminating lamp (S513), and carries out S501 and subsequent steps.

On the other hand, if the illuminating lamp is completely malfunctioning (S511: NO), the lamp operation part 66 refers to the usage history data of the other lamp stored in the storage part 62 to thereby determine whether the other lamp is completely malfunctioning (S512). Here, if the other lamp is completely malfunctioning, the lamp operation part 66 terminates the lamp operation.

In contrast, if the other lamp is not completely malfunctioning (S512: NO), the lamp operation part 66 turns off the illuminating lamp and switches the illumination lamp to the other lamp (S509). In parallel, the operation, the automatic switching mode is changed to the manual switching mode in which the other lamp is used as an illumination lamp. At the time, the flag for the automatic setting data in the automatic switching mode is not changed, and the amounts of change of the lamps 1 and 2 are reset to zero.

After the other lamp has been turned on as stated above, the process returns to S501 for operation of the other lamp. During illumination of the other lamp, the other lamp is determined as needed for life and malfunction as in the foregoing steps (S501 and S502). Then, the other lamp continues to illuminate as far as the other lamp has the life left and does not cause a malfunction.

As stated above, in the life priority mode, the illuminating lamp is turned off when having reached the end of the life. At the time, the other lamp will be turned on if the life of the other lamp is left, and the other lamp will not be turned on if the life of the other lamp is not left. In this manner, it is prevented that the lamp having reached the end of the life is turned on in the life priority mode. Therefore, it is possible to avoid a problem that the lamp having reached the end of the life is turned on and thus damaged in the life priority mode.

Meanwhile, in the continuation priority mode, even if the illuminating lamp has reached the end of the life, the illuminating lamp continues to illuminate as far as the illuminating lamp is not completely malfunctioning. Therefore, the continuation priority mode has an advantage that image projection is continued as much as possible even if the lamp has reached the end of the life during image projection.

According to this embodiment as stated above, it is possible to select as needed between the manual switching mode and the automatic switching mode, which allows the user to operate the lamps smoothly depending on scenes of usage of the projector.

For example, when making a presentation with the projector, the manual switching mode can be implemented in a usage pattern in which an old lamp is used for practice and a new high-intensity lamp is used for the real presentation.

Besides, if such a particular usage pattern as above is not necessary, the automatic switching mode may be selected to operate the two lamps evenly. In the automatic switching mode, the two lamps become deteriorated almost simultaneously, thereby to prevent that one of the lamps is more frequently operated and more increasingly deteriorated as compared with the other. Therefore, it is possible to suppress a problem that one of the lamps becomes deteriorated more prominently to cause an extreme change in quality of a projected image at lamp switching.

Moreover, if only the automatic switching mode was available, the two lamps are evenly operated and thus reach the end of the life at almost the same time, which may cause trouble to image projection. In this embodiment, however, the manual switching mode is available in addition to the automatic switching mode, and thus selecting the manual switching mode occasionally prevents a situation where the two lamps are used too evenly. This solves a problem that the two lamps reach the end of the life simultaneously and cause trouble to image projection.

Further, this embodiment allows mode selection between the life priority mode and the continuation priority mode as needed, so that, on one hand, it is possible to prevent that a lamp having reached the end of the life is continuously used and thus damaged, and on the other hand, it is possible to use a lamp having reached the end of the life but being still operable (a normally functioning or semi-malfunctioning lamp).

In the continuation priority mode, if a lamp having reached the end of the life is used, in particular, if a lamp having reached the end of the life and being semi-malfunctioning is continuously used, it is desired to notify the user of the current status of the lamp by a textual or graphic announcement on the projected image.

Furthermore, according to this embodiment, it is possible to prevent use of a completely malfunctioning lamp that has deteriorated and become incapable of illuminating, thereby avoiding an unnecessary illuminating operation of the lamp. In this embodiment, the malfunction determination shown in FIG. 14 is performed by repeatedly turning on a lamp a plurality number of times (Ns times) to thereby determine operational status of the lamp more reliably. In general, a lamp is difficult to turn on at a high lamp temperature, for example. However, this embodiment prevents that the lamp is determined as being malfunctioning by mistake even in such a situation, as shown in the flowchart of FIG. 14. Accordingly, it is possible to circumvent a problem that a lamp being not completely malfunctioning is determined as being completely malfunctioning by mistake and is withheld from operation, thereby resulting in more efficient use of the lamp.

Although an embodiment of the present invention has been described above, the present invention is not limited by the foregoing embodiment. In addition, the embodiment of the present invention can be modified in various manners. Hereinafter, modifications of the embodiment will be described.

Modification of the Malfunction Determination Process

In the malfunction determination process shown in FIG. 14, once a lamp has been determined as being completely malfunctioning, the lamp will not be determined thereafter as being normally functioning or semi-malfunctioning. However, as stated above, a lamp is generally difficult to turn on in a situation where a lamp temperature is high because the lamp has been just turned off or the like. Under such circumstances, the lamp might be determined as being malfunctioning by error even with a plurality of illumination attempts as shown in FIG. 14.

Figure 21:
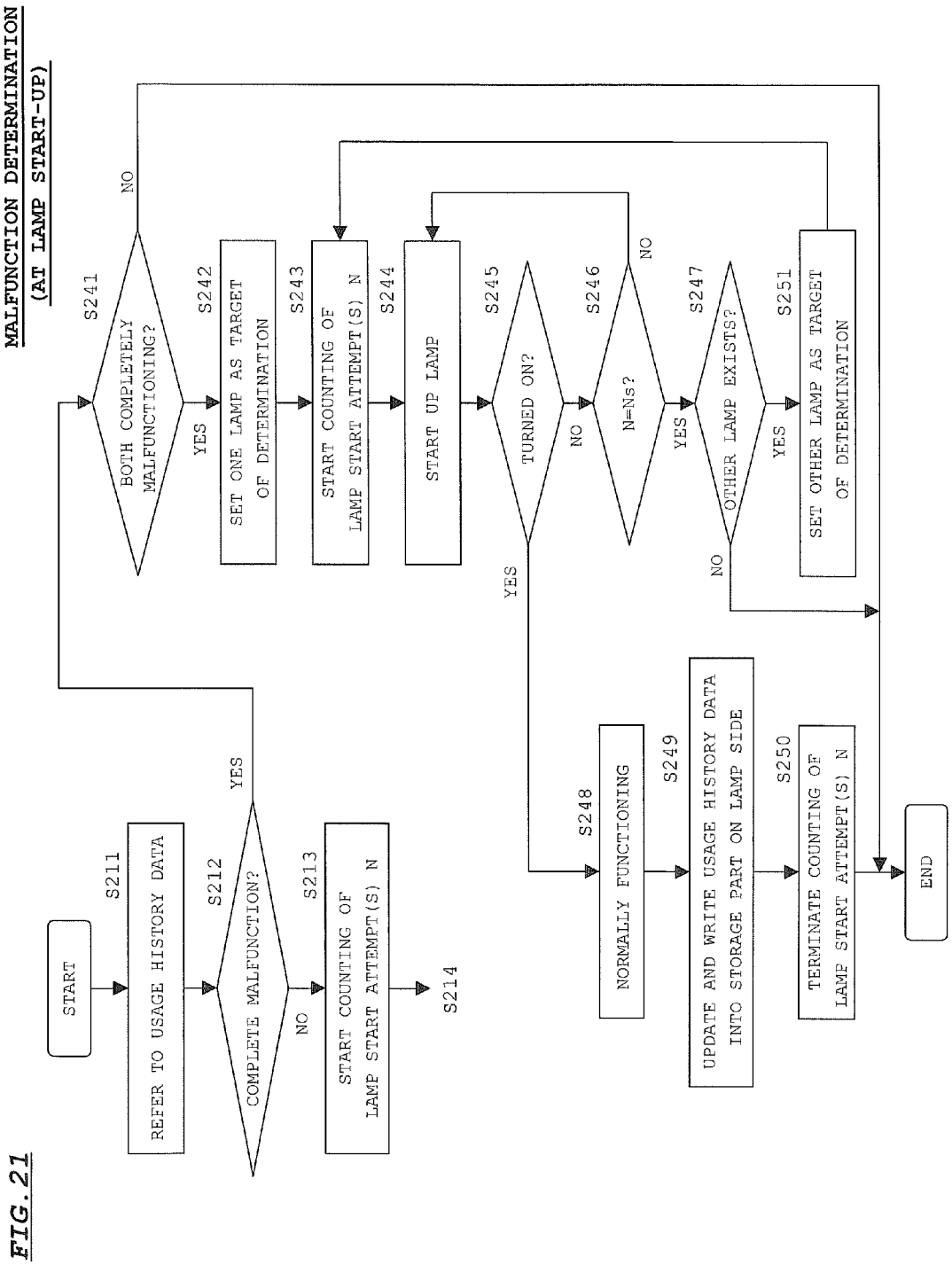
FIG. 21 is a flowchart of a modification of the malfunction determination process in the embodiment.

This modification is intended to avoid such a problem. FIG. 21 shows a lamp malfunction determination process in this modification. In the process flow of FIG. 21, S241 to S251 are added to the process flow of FIG. 14, but some of the steps in the process flow of FIG. 14 are not shown for the sake of convenience.

Prior to lamp start-up, the lamp operation part 66 and the malfunction determination part 68 refer to the usage history data of a lamp to be used, which is stored in the storage part 62 (S211). Here, if the usage history data indicates a complete malfunction (complete malfunction flag=1) (S212: YES), then the lamp operation part 66 refers to the usage history data of both the lamp to be used and the other lamp, thereby to determine whether both of the lamps are completely malfunctioning (S241). Here, if the other lamp is not completely malfunctioning (S241: NO), the malfunction determination part 68 terminates the malfunction determination process. In this case, the other lamp is operable.

On the other hand, if both of the lamps are completely malfunctioning (S241: YES), the lamp operation part 68 sets one of the lamps as a target of malfunction determination. Which lamp is to be set as a target of malfunction determination may be decided by default or depending on which of the lamps has been determined later as being completely malfunctioning. In the latter, the lamp operation part 68 holds information for specifying the lamp that has been determined later as being completely malfunctioning.

Afterward, the lamp operation part 66 starts to count the number of lamp start attempt(s) N (S243), and then starts up the lamp as a target of determination (S244). Then, the lamp operation part 66 increments the number of lamp start attempt(s) N by 1 in response to start-up of the lamp as a target of determination, and also determines whether the on/off detection part 63 has detected start of illumination in response to this start-up (S245).

The start-up attempts are repeated Ns times (S246). If the lamp as a target of a determination is turned on during the Ns start attempts (S245: YES), the malfunction determination part 68 determines that the lamp as a target of determination is normally functioning (S248), updates the usage history data stored in the storage part 62, and further writes the updated usage history data over the previous data in the storage part 71a or 71b of the corresponding lamp unit via the communication control part 61 (S249).

If the lamp as a target of determination is not turned on during the Ns start attempts (S246: YES), the lamp operation part 66 determines whether the other lamp has not been subjected yet to determination (S247). If the other lamp has not been determined yet (S247: YES), the lamp operation part 66 sets the other lamp as a target of determination (S251), and carries out S243 and subsequent steps. Accordingly, the other lamp is also subjected to Ns lamp start attempts. If the other lamp is turned on during the attempts (S245: YES), the malfunction determination part 68 determines the other lamp as being normally functioning (S248), updates the usage history data stored in the storage part 62, and further writes the updated usage history data over the previous data in the storage part 71a or 71b of the corresponding lamp unit via the communication control part 61 (S250).

On the other hand, if the other lamp is not turned on during the Ns start attempts (S246: NO), the malfunction determination part 68 terminates the malfunction determination part because both of the lamps have been already subjected to determination (S247). In this case, both of the lamps are inoperable.

In this embodiment, any lamp having been determined as being completely malfunctioning by mistake, will be correctly re-determined as being normally functioning by a subsequent verification. This allows proper and efficient use of the lamps, whereby the projector can properly perform functions thereof. In the flowchart of FIG. 21, if the lamp set earlier as a target of determination is determined as being normally functioning, the other lamp is not subjected to malfunction determination. Alternatively, the other lamp may be continuously subjected to malfunction determination.

Modification of the Life Priority Mode

In the life priority mode shown in FIG. 19, when the lamp as a target of illumination has reached the end of the life, lamp switching takes place or the lamp operation is terminated. In this case, the lamp having reached the end of the life can be prevented from being continuously used and thus damaged, but conversely, image projection is interrupted disadvantageously. In light of this respect, this modification allows the illuminating lamp to continue illumination until an instruction for termination of the lamp operation (image projection) is issued even if the lamp has reached the end of the life.

In this modification, switching of illumination lamps takes place when the illuminating lamp causes a malfunction. In such a case, if the automatic switching mode is set at the time, mode change occurs from the automatic switching mode to the manual switching mode in which the newly switched lamp is operated as an illumination lamp, as in the foregoing case of FIG. 19. At the time, the flag for the automatic setting data in the automatic switching mode is not changed and the amounts of change of the lamps 1 and 2 are reset to zero.

Figure 22:
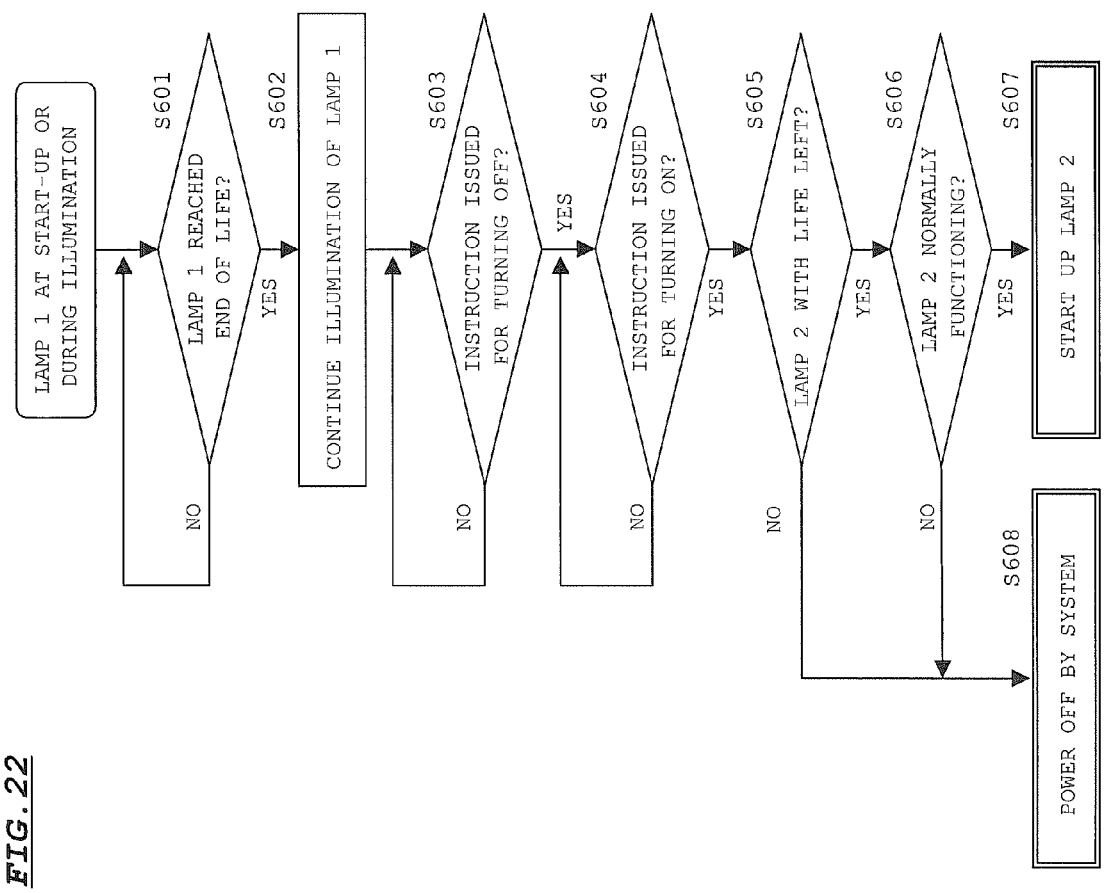
FIG. 22 is a flowchart of a modification of the process in the life priority mode in the embodiment.
Figure 23:
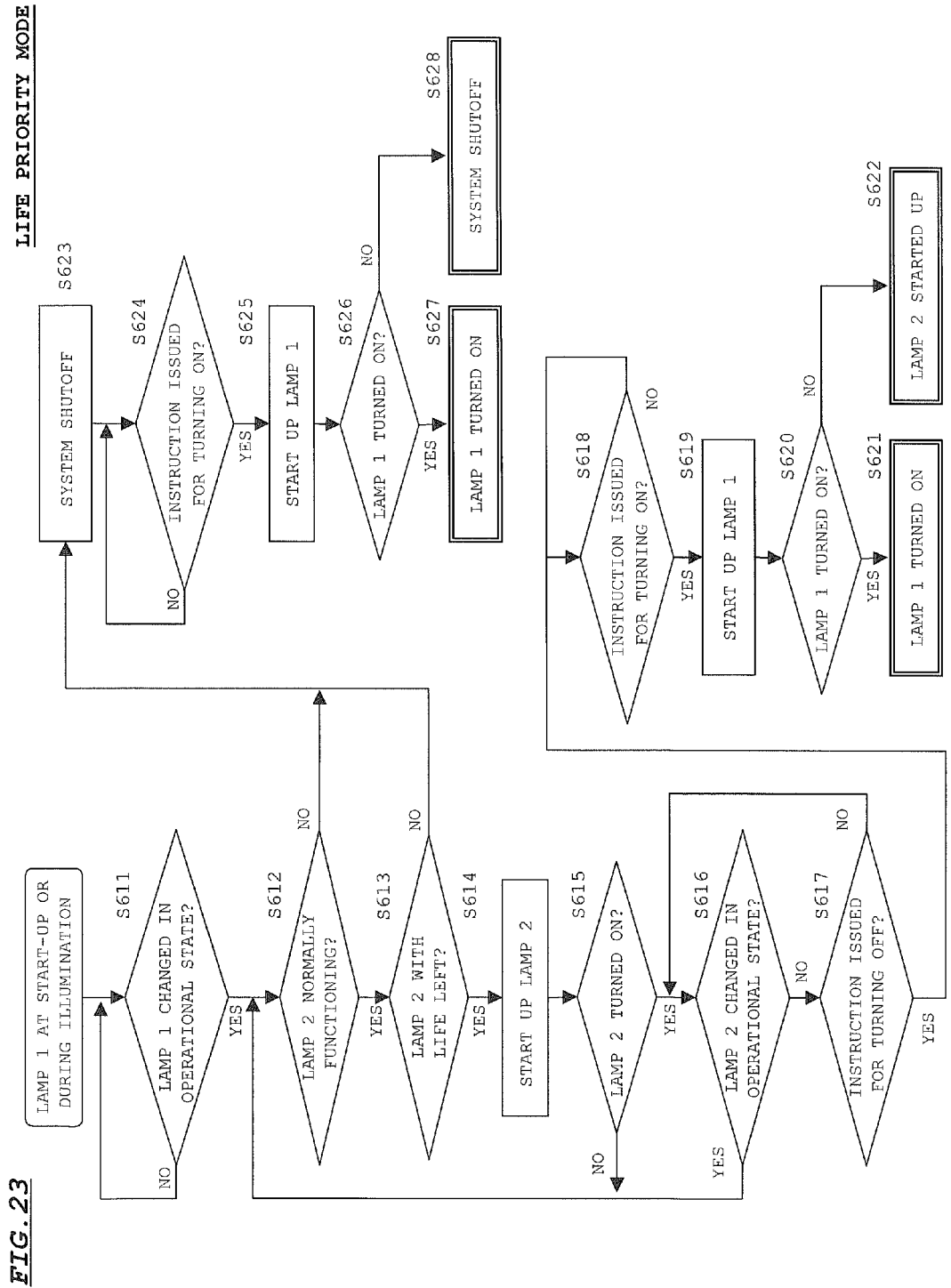
FIG. 23 is a flowchart of a modification of the process in the life priority mode in the embodiment.

FIGS. 22 and 23 illustrate process flows in the life priority mode of this modification. FIG. 22 shows the process flow of a part of lamp operation in the life priority mode with regard to the life of a lamp to be used; and FIG. 23 the process flow of a part of lamp operation with regard to the operational status of a lamp to be used (malfunction). Hereinafter, those process flows will be described taking as an example a case where the lamp 1 is set as a lamp to be used in the manual switching mode or the automatic switching mode.

First, referring to FIG. 22, when the lamp is started up or turned on, the lamp operation part 66 monitors the life determination part 67 to check whether the life determination part 67 has determined that the lamp 1 has reached the end of the life (S601). When the lamp 1 has repeatedly illuminated and thus reached the end of the life (S601: YES), the lamp operation part 66 sets the lamp 2 as a target of illumination for a next-time lamp operation, and continues the illumination of the lamp 1 (S602) until an instruction for turning off the lamp is issued from the user (S603: YES). If such an instruction for turning off the lamp is issued from the user (S603: YES), the lamp operation part 66 turns off the lamp 1. At the time, the projector enters a standby state.

Afterward, if an instruction for turning on the lamp is issued from the user (S604: YES), the lamp operation part 66 determines whether the life determination part 67 has determined that the lamp 2 has reached the end of the life (S605). If the life of the lamp 2 is left, the lamp operation part 66 refers to the usage history data of the lamp 2 stored in the storage part 62 to thereby determine whether the lamp 2 is normally functioning (neither semi-malfunctioning nor completely malfunctioning) (S606). Here, if the lamp 2 is normally functioning (S606: YES), the lamp operation part 66 starts up the lamp 2 (S607). On the other hand, if the lamp 2 is not normally functioning, the lamp operation part 66 causes the system to shut off (S608). When the lamp 2 is started up at S607, the lamp 2 is subjected to S601 and subsequent steps.

Next, referring to FIG. 23, if the lamp 1 is not turned on at start-up of the lamp 1 or if the lamp 1 is turned off during an illuminating operation (S611: YES), the lamp operation part 66 refers to the usage history data of the lamp 2 stored in the storage part 62 to thereby determine whether the lamp 2 is normally functioning (S612). Here, if the lamp 2 is normally functioning, the lamp operation part 66 further refers to a result of life determination on the lamp 2 by the life determination part 67 to thereby determine whether the life of the lamp 2 is left (S613).

If the lamp 2 is not normally functioning or if the life of the lamp 2 is not left, the lamp operation part 66 causes the system to shut off (S623). On the other hand, if the life of the lamp 2 is left (S613: YES), the lamp operation part 66 starts illumination of the lamp 2 (S614).

Here, if the lamp 2 is not turned on (S615: NO), the lamp operation part 66 determines the lamp 2 as being semi-malfunctioning (S612: NO), and causes the system to shut off (S623). On the other hand, if the lamp 2 is turned on (S615: YES), the lamp operation part 66 continues the illumination of the lamp 2 until the lamp 2 has caused a malfunction (normally functioning→semi-malfunctioning) (S616: YES) or until an instruction for turning off the lamp is issued from the user (S617: YES). If the lamp 2 is burnt out during the illuminating operation, the lamp operation part 66 determines the lamp 2 as being semi-malfunctioning (S612: NO), and causes the system to shut off (S623).

If an instruction for turning off the lamp is issued from the user at S617, the lamp operation part 66 turns off the lamp 2. At the time, the projector enters a standby state. Afterward, if an instruction for turning on the lamp is issued from the user, the lamp operation part 66 first starts illumination of the lamp 1 (S619). If the lamp 1 is turned on accordingly (S620: YES), the lamp operation part 66 continues the illumination of the lamp 1 (S612). In this case, the process returns to S611 to carry out the same operation on the lamp 1 again.

On the other hand, if the lamp 1 is not turned on (S620: NO), the lamp operation part 66 starts illumination of the lamp 2. In this case, the lamp operation part 66 subjects the lamp 2 to S601 and subsequent steps.

After the shutoff of the system at S623, if an instruction for turning on the lamp is issued from the user (S624: YES), the lamp operation part 66 starts illumination of the lamp 1 (S625). If the lamp 1 is turned on accordingly (S626: YES), the lamp operation part 66 continues the illumination of the lamp 1 (S627). In this case, the process returns to S611 to carry out the same operation on the lamp 1 again. On the other hand, if the lamp 1 is not turned on (S626: NO), the lamp operation part causes the system to shut off (S628).

According to the process flow of FIG. 22 in this modification, even if the lamp 1 has reached the end of the life at start of illumination or during illumination, the lamp 1 continues to illuminate until an instruction for turning off the lamp is issued from the user (S602 and S603), thereby to prevent interruption of image projection due to the expiration of the life of the lamp. This improves convenience for the user.

In addition, according to the process flow of FIG. 23 in this modification, when the lamp 1 causes a malfunction, the system is shut off without turning on the lamp 2 if the life of the lamp 2 is not left (S613 and S623). This prevents that the lamp 2 illuminates with the life expired and thus suffers damage or the like.

Further, according to the process flow of FIG. 23 in this modification, after the system has been shut off due to improper use of the lamp 2 (S612, S613, and S623), if an instruction for turning on the lamp is issued from the user (S624), the lamp 1 is started up for illumination (S625). Accordingly, even if the lamp 1 is determined at S611 as being malfunctioning by mistake for some reason, it is possible to correct the determination so as to continue the operation of the lamp 1.

Moreover, according to the present invention, after the lamp for use is switched to the lamp 2 (S614, S615, and S616), if an instruction for turning off the lamp is issued from the user (S617) and afterward an instruction for turning on the lamp is issued from the user (S618), the lamp 1 is started up for illumination (S626). Accordingly, even if the lamp 1 is determined at S611 as being malfunctioning by mistake for some reason, it is possible to correct the determination so as to continue the operation of the lamp 1.

Modification of the Continuation Priority Mode

Figure 24:
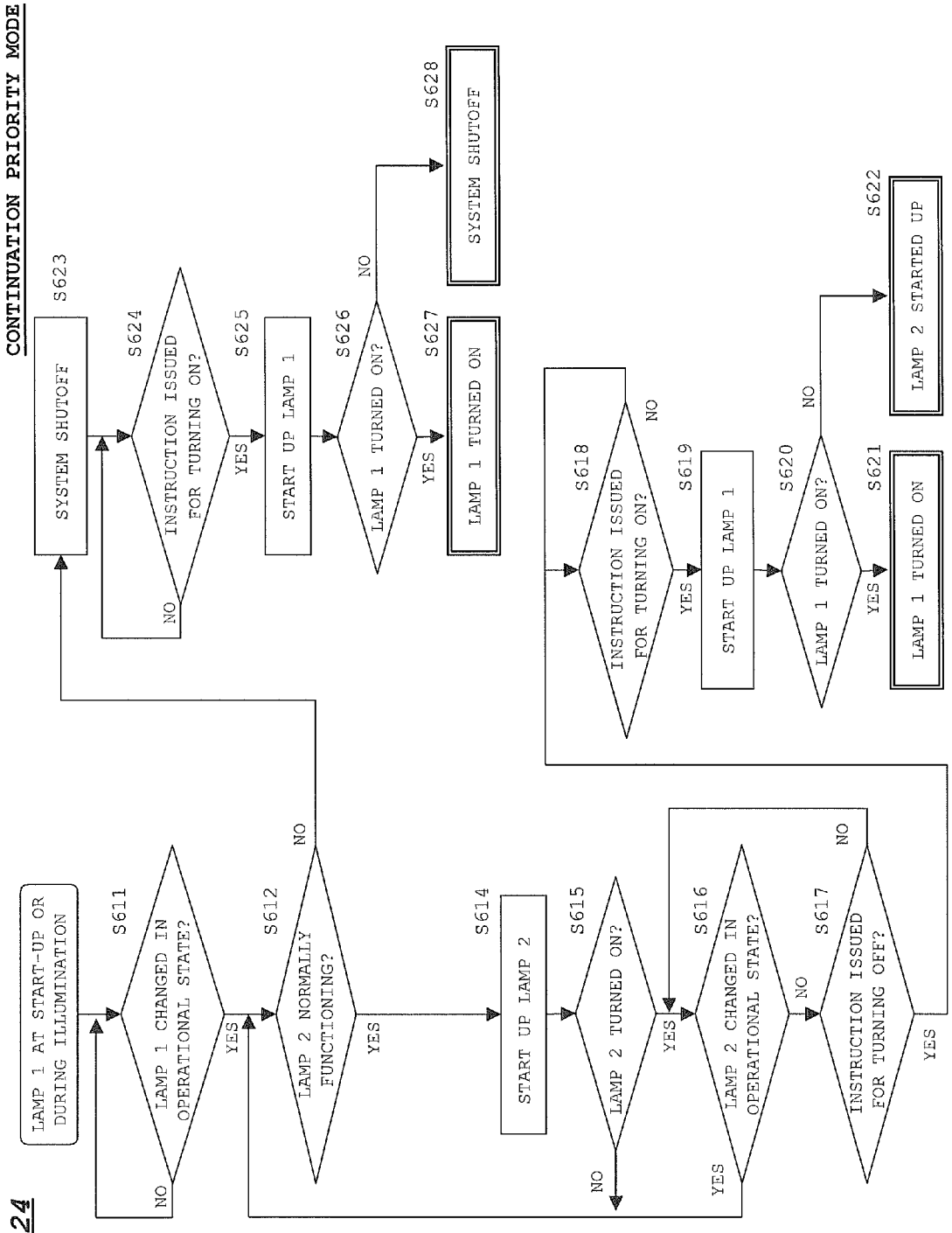
FIG. 24 is a flowchart of a modification of the process in the continuation priority mode in the embodiment.

FIG. 24 is a process flowchart of a modification of the continuation priority mode. This process flowchart is identical to that shown in FIG. 23 except that step S613 is not shown.

In this modification, if the lamp 2 is determined at S612 as being normally functioning, the lamp 2 is started up for illumination regardless whether the life of the lamp 2 is left or not. Specifically, if the lamp 1 causes a malfunction (S611) and the lamp 2 is determined as being normally functioning (S612), the lamp 2 is started up for illumination regardless whether the life of the lamp 2 is left or not (S614). If the lamp 2 is turned on accordingly, the lamp 2 is used as it is (S615). Accordingly, it is possible to continue image projection even if the lamp 1 is turned off, thereby improving convenience for the user.

In addition to the modifications as described above, the embodiment of the present invention can be modified in various other manners.

For example, although the foregoing embodiment employs a projector on which two lamp units can be mounted, the number of lamp unit (s) may be one, or three or more. In addition, the lamp unit in the present invention is applicable to products other than projectors. If three or more lamp units are arranged, the illuminating order of the lamps may be set in the automatic switching mode, so that the lamp units are changed in sequence. In addition, the life priority mode may be implemented in such a manner that if the illuminating lamp reaches the end of the life or causes a malfunction, the illumination lamp is switched to any of the other lamps that has the life left and is best functioning (not completely malfunctioning). Further, the continuation priority mode may be implemented in such a manner that if the illuminating lamp reaches the end of the life or causes a malfunction, for example, illumination is continued if the illumination lamp is not completely malfunctioning (nor semi-malfunctioning), and otherwise the illumination lamp is switched to any of the other lamps that is best functioning (not completely malfunctioning).

In addition, although the foregoing embodiment employs two kinds of data shown in FIG. 11B as lamp management information for managing a lamp unit, the lamp management information may contain information other than the foregoing information. For example, the lamp management information may contain information for lamp identification such as a model number, information on the lamp's characteristics such as intensity of illumination, color variability, and the like.

In addition, the user may include by themselves the name, operation starting date, and operational status of a lamp unit as necessary in the lamp management information. Such information can be input from the operating part of the projector or can be written from a personal computer via a dedicated interface. This allows the user to check the lamp unit-specific information as necessary, resulting in enhanced convenience for the user.

The foregoing information, as well as the cumulative time data (cumulative operating time) and the usage history data (malfunction state), is desirably capable of being shown to the user in the form of a user menu or the like. This allows the user to smoothly set operation modes or select a lamp to be used in the manual switching mode. In addition, a result of malfunction determination is desirably notified to the user as needed via an indicator for announcing time for lamp replacement or the like. This allows the user to learn any lamp failure accurately.

In the foregoing embodiment, a cooling unit 4 is desirably configured so as to cool either one of the two lamp units 10*a* and 10*b* selectively and intensively. In this case, the cooling unit 4 is controlled to cool the lamp unit to be used in conjunction with the lamp operation part 66.

In the foregoing embodiment, when replacing the lamp units, the user needs to open a lamp cover (not shown) on the cabinet 1. In this case, it is necessary to suppress illumination of the lamp while the lamp cover is open for safety reasons. Accordingly, in the foregoing embodiment, a detection means is provided to detect the open or closed state of the lamp cover so that the lamp will not be turned on when the lamp cover is open.

Therefore, in the foregoing embodiment, if the lamp is not turned on due to the open lamp cover, the lamp is not determined as being malfunctioning and such a non-illuminating state is not recorded in the storage parts 62, 71*a* and 71*b*. That is, even if the on/off detection part does not detect illumination of the lamp, the malfunction determination part 68 does not determine the lamp as being malfunctioning as far as the detection means detects the opening status of the lamp cover.

The embodiments of the present invention can be appropriately modified in various manners within the scope of the technical idea specified in the claims.

What is claimed is:

1. A lamp operation device switching between a plurality of lamps to generate illumination light, comprising:
a setting part for setting an operation mode for the lamps; and
an operation part for controlling switching between the lamps in accordance with the set operation mode, wherein
the operation part includes a first process corresponding to a manual switching mode in which a lamp selected by the user is set as an illumination lamp; and a second process corresponding to an automatic switching mode in which the plurality of lamps are automatically set in sequence as an illumination lamp, and
in the second process, after a first lamp has been set as the illumination lamp, cumulative illuminating time of the first lamp is measured, and the illumination lamp is switched to a second lamp other than the first lamp, depending on whether a measurement result has exceeded predetermined threshold time.

2. The lamp operation device according to claim 1, wherein
in the second process, the first lamp continues to illuminate for a period of time during which an illuminating operation is to be continued even after the measurement result has exceeded the predetermined threshold time, and the second lamp is turned on for next-time illumination after end of the illumination of the first lamp.

3. The lamp operation device according to claim 1, further comprising:
a malfunction determination part for determining whether the lamp is malfunctioning, wherein
in the second process, if the first lamp set as the illumination lamp is malfunctioning, the illumination lamp is switched to the second lamp.

4. The lamp operation device according to claim 3, wherein
the malfunction determination part attempts illumination start of the first lamp Ns times (Ns denotes an integer of 2 or larger) at lamp start-up, and determines that the first lamp is malfunctioning if the first lamp has not been turned on by the Ns illumination start attempts.

5. The lamp operation device according to claim 1, wherein
the operation part further includes a third process corresponding to a life priority mode in which the illumination lamp is selected with priority given to the life of each of the lamps, and
the third process includes steps of holding a reference lifetime indicative of the life of the lamp; and avoiding illumination of the first lamp if cumulative operating time of the first lamp as the illumination lamp from start of operation has exceeded the reference lifetime of the first lamp.

6. The lamp operation device according to claim 5, wherein
in the third process, if cumulative operating time of the first lamp has exceeded the reference lifetime of the first lamp and the remaining life of the first lamp has expired during an illuminating operation, the first lamp continues to illuminate until an external manipulation is performed to stop the illumination, and then the first lamp is excluded from the candidates for the illumination lamp for next-time illumination after end of the illumination of the first lamp.

7. The lamp operation device according to claim 5, wherein
in the third process, if cumulative operating time of the first lamp has exceeded the reference lifetime of the first lamp and the remaining life of the first lamp has expired during an illuminating operation, the illumination of the first lamp is stopped.

8. The lamp operation device according to claim 7, wherein
the third process includes steps of determining the remaining life of each of the lamps on the basis of the cumulative operating time and the reference lifetime of the each lamp when stopping illumination of the first lamp; and turning on the second lamp with the life not yet expired, in place of the first lamp.

9. The lamp operation device according to claim 8, wherein the operation part includes a fourth process corresponding to a continuation priority mode in which the illumination lamp is selected with priority given to continuation of the supply of illumination light,
a malfunction determination part is further provided to determine whether the lamp is malfunctioning, and
the fourth process includes a step of continuing illumination of the first lamp as far as the first lamp is not malfunctioning if it is determined in the third process that there is no second lamp with the life not expired.

10. The lamp operation device according to claim 9, wherein
the fourth process includes the step of, if it is determined in the third process that there is no second lamp with the life not expired and if the first lamp is malfunctioning, turning on the second lamp that has the life expired but is not malfunctioning.

11. The lamp operation device according to claim 1, wherein
the operation part includes a process corresponding to a continuation priority mode in which the illumination lamp is selected with priority given to continuation of the supply of illumination light,
a malfunction determination part is further provided to determine whether the lamp is malfunctioning, and
the process corresponding to the continuation priority mode includes the step of, when stopping illumination of the first lamp in accordance with the determination made by the malfunction determination part, turning on the second lamp not malfunctioning in place of the first lamp, regardless of the presence or absence of the remaining life.

12. An image display device, comprising
a lamp operation device for switching between a plurality of lamps to generate illumination light, wherein:
the lamp operation device includes
a setting part for setting an operation mode for the lamps; and
an operation part for controlling switching between the lamps in accordance with the set operation mode;
the operation part includes a first process corresponding to a manual switching mode in which a lamp selected by the user is set as an illumination lamp; and a second process corresponding to an automatic switching mode in which the plurality of lamps is automatically set in sequence as an illumination lamp; and
in the second process, after a first lamp has been set as the illumination lamp, cumulative illuminating time of the first lamp is measured, and the illumination lamp is switched to a second lamp other than the first lamp, depending on whether a measurement result has exceeded predetermined threshold time.

13. The image display device according to claim 12, wherein
in the second process, the first lamp continues to illuminate for a period of time during which an illuminating operation is to be continued even after the measurement result has exceeded the predetermined threshold time, and the second lamp is turned on for next-time illumination after end of the illumination of the first lamp.

14. The image display device according to claim 12, further comprising:
a malfunction determination part for determining whether the lamp is malfunctioning, wherein
in the second process, if the first lamp set as the illumination lamp is malfunctioning, the illumination lamp is switched to the second lamp.

15. The image display device according to claim 14, wherein
the malfunction determination part attempts illumination start of the first lamp Ns times (Ns denotes an integer of 2 or larger) at lamp start-up, and determines that the first lamp is malfunctioning if the first lamp has not been turned on by the Ns illumination start attempts.

16. The image display device according to claim 12, wherein
the operation part further includes a third process corresponding to a life priority mode in which the illumination lamp is selected with priority given to the life of each of the lamps, and
the third process includes steps of holding a reference lifetime indicative of the life of the lamp; and avoiding illumination of the first lamp if cumulative operating time of the first lamp as the illumination lamp from start of operation has exceeded the reference lifetime of the first lamp.

17. The image display device according to claim 16, wherein
in the third process, if cumulative operating time of the first lamp has exceeded the reference lifetime of the first lamp and the remaining life of the first lamp has expired during an illuminating operation, the first lamp continues to illuminate until an external manipulation is performed to stop the illumination, and then the first lamp is excluded from the candidates for the illumination lamp for next-time illumination after end of the illumination of the first lamp.

18. The image display device according to claim 16, wherein
in the third process, if cumulative operating time of the first lamp has exceeded the reference lifetime of the first lamp and the remaining life of the first lamp has expired during an illuminating operation, the illumination of the first lamp is stopped.

19. The image display device according to claim 18, wherein
the third process includes steps of determining the remaining life of each of the lamps on the basis of the cumulative operating time and the reference lifetime of the each lamp when stopping illumination of the first lamp; and turning on the second lamp with the life not yet expired, in place of the first lamp.

20. The image display device according to claim 19, wherein
the operation part includes a fourth process corresponding to a continuation priority mode in which the illumination lamp is selected with priority given to continuation of the supply of illumination light,
a malfunction determination part is further provided to determine whether the lamp is malfunctioning, and
the fourth process includes a step of continuing illumination of the first lamp as far as the first lamp is not malfunctioning if it is determined in the third process that there is no second lamp with the life not expired.

* * * * *